US010580052B2

(12) United States Patent
Bonner et al.

(10) Patent No.: US 10,580,052 B2
(45) Date of Patent: *Mar. 3, 2020

(54) SYSTEMS AND METHODS FOR CONTROLLING SHELF DISPLAY UNITS AND FOR GRAPHICALLY PRESENTING INFORMATION ON SHELF DISPLAY UNITS

(71) Applicant: Sunrise R&D Holdings, LLC, Cincinnati, OH (US)

(72) Inventors: Brett Bracewell Bonner, New Richmond, OH (US); Titus Arthur Jones, Hebron, KY (US); Richard Alexander Grosse, III, Cincinnati, OH (US); Michael John Zettler, Alexandria, KY (US); Christopher Todd Hjelm, Cincinnati, OH (US)

(73) Assignee: SUNRISE R&D HOLDINGS, LLC, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/409,935

(22) Filed: May 13, 2019

(65) Prior Publication Data
US 2019/0266652 A1 Aug. 29, 2019

Related U.S. Application Data

(63) Continuation of application No. 15/144,041, filed on May 2, 2016, now Pat. No. 10,339,579.
(Continued)

(51) Int. Cl.
*G06Q 30/06* (2012.01)
*G06Q 30/02* (2012.01)
(Continued)

(52) U.S. Cl.
CPC ....... *G06Q 30/0617* (2013.01); *G06F 3/0482* (2013.01); *G06F 3/1423* (2013.01);
(Continued)

(58) Field of Classification Search
CPC ........ G06Q 30/00; G06Q 10/08; G06Q 10/00; G06Q 30/0223; G06Q 10/087; G06K 9/00; G06K 9/62; G06K 17/00
(Continued)

(56) References Cited

U.S. PATENT DOCUMENTS

| 4,500,880 A | 2/1985 | Gomersall et al. |
| 4,750,151 A | 6/1988 | Baus |

(Continued)

FOREIGN PATENT DOCUMENTS

| DE | 29515221 U1 | 11/1995 |
| EP | 0105577 A1 | 4/1984 |

(Continued)

OTHER PUBLICATIONS

CDS, Crystal Display Systems, The Clear Choice for Display Solutions, Revolutionary Shelf Edge Displays from in the UK, http://crystal-display.com/digital-signage/shelf-edge-displays/, First Accessed Oct. 18, 2011.
(Continued)

*Primary Examiner* — Olusegun Goyea
(74) *Attorney, Agent, or Firm* — Dinsmore & Shohl LLP

(57) ABSTRACT

Systems and methods for controlling shelf display units and for graphically presenting information on shelf display units are disclosed. A system includes one or more display units configured to be coupled to shelves of a modular shelving system, one or more processors communicatively coupled to the one or more display units, one or more memory components communicatively coupled to the one or more processors, and machine readable instructions stored in the one
(Continued)

or more memory components. When executed by the one or more processors, the machine readable instructions cause the system to determine a product identifier corresponding to a product, identify one or more display units to update in response to determining the product identifier corresponding to the product, and update a graphical output of the one or more display units identified to be updated in response to identifying the one or more display units to update.

8 Claims, 11 Drawing Sheets

Related U.S. Application Data

(60) Provisional application No. 62/233,827, filed on Sep. 28, 2015, provisional application No. 62/156,589, filed on May 4, 2015.

(51) Int. Cl.
*G06F 3/0482* (2013.01)
*G06F 3/14* (2006.01)
*G06K 7/10* (2006.01)
*G06K 19/06* (2006.01)
*G06Q 10/08* (2012.01)

(52) U.S. Cl.
CPC .... *G06K 7/10861* (2013.01); *G06K 19/06112* (2013.01); *G06Q 10/087* (2013.01); *G06Q 30/0256* (2013.01); *G06Q 30/0261* (2013.01); *G06Q 30/0278* (2013.01); *G06Q 30/06* (2013.01); *G06Q 30/0625* (2013.01); *G06Q 30/0635* (2013.01)

(58) Field of Classification Search
USPC ..... 705/14.24, 14.5, 28; 340/572.1; 382/103
See application file for complete search history.

(56) References Cited

U.S. PATENT DOCUMENTS

| | | | |
|---|---|---|---|
| 5,448,226 A | 9/1995 | Failing, Jr. et al. | |
| 5,572,653 A | 11/1996 | DeTemple et al. | |
| 5,694,142 A | 12/1997 | Dumoulin et al. | |
| 5,898,383 A | 4/1999 | Forsythe | |
| 6,011,487 A | 1/2000 | Plocher | |
| 6,105,004 A | 8/2000 | Halperin et al. | |
| 6,424,998 B2 | 7/2002 | Hunter | |
| 6,430,603 B2 | 8/2002 | Hunter | |
| 6,430,605 B2 | 8/2002 | Hunter | |
| 6,464,142 B1 | 10/2002 | Denenberg et al. | |
| 6,870,670 B2 | 3/2005 | Gehring et al. | |
| 6,874,684 B1 | 4/2005 | Denenberg et al. | |
| 6,948,820 B2 | 9/2005 | Veligdan et al. | |
| 6,995,906 B2 | 2/2006 | Edney | |
| 7,057,578 B2 | 6/2006 | Yaniv | |
| 7,093,755 B2 | 8/2006 | Jordan et al. | |
| 7,286,101 B2 | 10/2007 | Hosaka | |
| 7,286,111 B2 | 10/2007 | Stephenson, III | |
| 7,287,001 B1 | 10/2007 | Falls et al. | |
| 7,369,047 B2 | 5/2008 | Broad et al. | |
| 7,410,098 B2 | 8/2008 | Denenberg et al. | |
| 7,537,155 B2 | 5/2009 | Denenberg et al. | |
| 7,564,349 B2 | 7/2009 | Robey | |
| 7,696,897 B2 | 4/2010 | Horii et al. | |
| 7,778,942 B2 | 8/2010 | Naito | |
| 7,792,711 B2 | 9/2010 | Swafford, Jr. et al. | |
| 7,798,652 B2 | 9/2010 | Ikeda et al. | |
| 7,830,259 B2 | 11/2010 | Walker et al. | |
| 7,832,874 B2 | 11/2010 | Ikeda et al. | |
| 7,834,819 B2 | 11/2010 | Dunn et al. | |
| 7,948,448 B2 | 5/2011 | Hutchinson et al. | |
| 7,954,958 B2 | 6/2011 | Ikeda et al. | |
| 7,954,959 B2 | 6/2011 | Ikeda et al. | |
| 7,997,734 B2 | 8/2011 | Mochizuki et al. | |
| 2001/0045893 A1* | 11/2001 | Swartzel | G06K 17/00 340/572.1 |
| 2002/0147597 A1 | 10/2002 | Conners et al. | |
| 2002/0163720 A1 | 11/2002 | Piepel et al. | |
| 2005/0116821 A1 | 6/2005 | Wilsey et al. | |
| 2005/0155070 A1 | 7/2005 | Slaughter | |
| 2006/0232981 A1 | 10/2006 | Pfund et al. | |
| 2007/0229222 A1 | 10/2007 | Leeds | |
| 2007/0287413 A1 | 12/2007 | Kleitsch et al. | |
| 2008/0151197 A1 | 6/2008 | Mochizuki et al. | |
| 2008/0204672 A1 | 8/2008 | Ikeda et al. | |
| 2009/0059175 A1 | 3/2009 | Le Quesne et al. | |
| 2009/0059270 A1* | 3/2009 | Opalach | G06K 9/00 358/1.15 |
| 2009/0108991 A1 | 4/2009 | Chadbourne et al. | |
| 2010/0014592 A1 | 1/2010 | Yoshimatsu et al. | |
| 2010/0102930 A1 | 4/2010 | McCoy | |
| 2010/0106588 A1* | 4/2010 | Jones | G06F 3/147 705/14.24 |
| 2010/0138322 A1 | 6/2010 | Nakamura | |
| 2010/0169186 A1 | 7/2010 | Sakaguchi et al. | |
| 2010/0169196 A1 | 7/2010 | De Luca | |
| 2010/0225444 A1 | 9/2010 | Nobutsugu et al. | |
| 2010/0328615 A1 | 12/2010 | Ikeda et al. | |
| 2011/0019162 A1 | 1/2011 | Huebner | |
| 2011/0102144 A1 | 5/2011 | Okina et al. | |
| 2011/0102750 A1 | 5/2011 | Ikeda et al. | |
| 2011/0199585 A1 | 8/2011 | Ikeda et al. | |
| 2011/0204009 A1 | 8/2011 | Karan | |
| 2011/0205500 A1 | 8/2011 | Ikeda et al. | |
| 2013/0176398 A1 | 7/2013 | Bonner et al. | |
| 2014/0258028 A1 | 9/2014 | Bynum et al. | |
| 2015/0088703 A1* | 3/2015 | Yan | G06F 3/147 705/28 |
| 2015/0220790 A1* | 8/2015 | Gold | G06K 9/00664 382/103 |

FOREIGN PATENT DOCUMENTS

| | | |
|---|---|---|
| EP | 1839536 A2 | 10/2007 |
| JP | 2009160020 A | 7/2009 |
| JP | 2010194043 A | 9/2010 |
| WO | 2002/054918 | 7/2002 |
| WO | 2005/086047 | 9/2005 |
| WO | 2009/09403 | 1/2009 |

OTHER PUBLICATIONS

International Search Report and Written Opinion dated Jul. 13, 2016 for PCT/US2016/030363 Filed May 2, 2016. pp. 1-12.
European Examination Report for EP16728132.8 dated Jan. 4, 2019.

* cited by examiner

SYSTEMS AND METHODS FOR CONTROLLING SHELF DISPLAY UNITS AND FOR GRAPHICALLY PRESENTING INFORMATION ON SHELF DISPLAY UNITS

CROSS-REFERENCE TO RELATED APPLICATIONS

This application is a continuation of U.S. application Ser. No. 15/144,041 filed on May 2, 2016 which claims the benefit of: (i) U.S. Provisional Application No. 62/156,589, entitled "Systems And Methods For Controlling Shelf Display Units And For Graphically Presenting Information On Shelf Display Units," filed May 4, 2015; and (ii) U.S. Provisional Application No. 62/233,827, entitled "Systems And Methods For Graphically Presenting Product Location Indications And Additional Product Information On Shelf Display Units," filed Sep. 28, 2015, the entirety of which are hereby incorporated by reference.

TECHNICAL FIELD

The present specification relates to shelf display units, and more particularly, to systems and methods for controlling shelf display units and for graphically presenting information on shelf display units.

BACKGROUND

Products are generally displayed on shelves at a point of purchase. The shelves may include powered display units that provide information pertaining to the products displayed on the shelves, or any other type of information. It may be desirable for the display units to display a variety of information useful to associates working at a store selling products, consumers shopping at a store that sells products, and others.

Accordingly, there is a need for systems and methods for controlling shelf display units and for graphically presenting information on shelf display units.

SUMMARY

In one embodiment, a system for graphically presenting a product location indication on one or more display units includes one or more display units configured to be coupled to shelves of a modular shelving system, one or more processors communicatively coupled to the one or more display units, one or more memory components communicatively coupled to the one or more processors, and machine readable instructions stored in the one or more memory components. When executed by the one or more processors, the machine readable instructions cause the system to determine a product identifier corresponding to a product, identify one or more display units to update in response to determining the product identifier corresponding to the product, and update a graphical output of the one or more display units identified to be updated in response to identifying the one or more display units to update.

In another embodiment, a system for graphically presenting personalized content to a consumer on one or more display units includes one or more display units configured to be coupled to shelves of a modular shelving system, one or more processors communicatively coupled to the one or more display units, one or more memory components communicatively coupled to the one or more processors, and machine readable instructions stored in the one or more memory components. When executed by the one or more processors, the machine readable instructions cause the system to receive a consumer identifier, identify content for display to the consumer based on the consumer identifier, determine a consumer location, determine whether the consumer is proximate the one or more display units based on the consumer location, and display the identified content on the one or more display units in response to determining that the consumer is proximate to the one or more display units.

In yet another embodiment, a system for displaying additional product information includes one or more display units configured to be coupled to shelves of a modular shelving system, one or more processors communicatively coupled to the one or more display units, one or more memory components communicatively coupled to the one or more processors, and machine readable instructions stored in the one or more memory components. When executed by the one or more processors, the machine readable instructions cause the system to associate additional product information with a product, determine a location of the product, identify a display unit coupled to a shelf of the modular shelving system that is associated with the product based on the location of the product, and display the additional product information on the identified display unit.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Referring generally to the figures, embodiments described herein are directed to systems and methods for controlling shelf display units and for graphically presenting information on shelf display units. The embodiments herein may display a variety of information useful to associates working at a store selling products, consumers shopping at a store that sells products, and others. Embodiments of the systems and methods for controlling shelf display units and for graphically presenting information on shelf display units will be described in more detail herein with reference to the attached figures.

Figure 1:
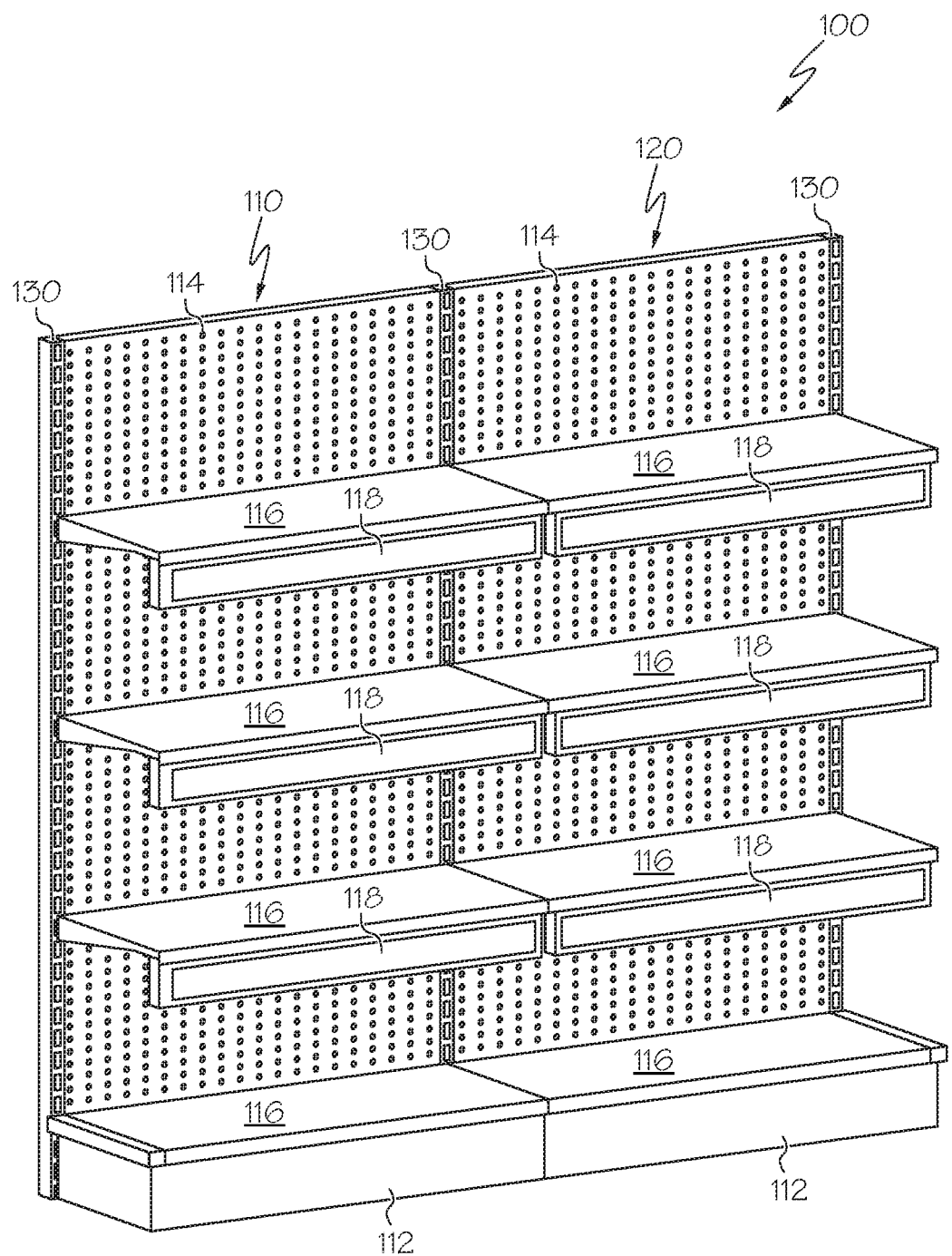
FIG. 1 schematically depicts a perspective view of a modular shelving system including a plurality of display units, according to one or more embodiments shown and described herein.

Referring now to FIG. 1, a perspective view of a modular shelving system 100 including a first shelving module 110, a second shelving module 120, and a plurality of interfacing uprights 130 is schematically depicted. Each of the first shelving module 110 and the second shelving module 120 includes a base 112, a back plane 114, a plurality of shelves 116, and a plurality of display units 118. The back plane 114 is generally planar and extends substantially perpendicularly from the base 112. The plurality of shelves 116 are secured to the plurality of interfacing uprights 130, each of which includes a plurality of apertures through which corresponding projections of the plurality of shelves 116 may be inserted to mount the plurality of shelves 116 to the shelving modules. The plurality of shelves 116 extend substantially perpendicularly from the back plane 114 in a direction that is substantially parallel to the base 112. The assembly of the shelving modules and the interfacing uprights 130 support the plurality of shelves 116 on which products may be placed. The plurality of display units 118 extend beneath the plurality of shelves 116 and are operable to display information to a person near the shelving modules, such as information pertaining to products on the plurality of shelves 116, information useful to stock products on the plurality of shelves 116, information useful to retrieve products from the plurality of shelves 116, and a variety of additional information, as will be described in detail below.

Still referring to FIG. 1, in some embodiments, each of the plurality of display units 118 is powered by an Ethernet connection or through the back plane 114, as described in U.S. patent application Ser. No. 13/734,443, entitled "DISPLAY SHELF MODULES WITH PROJECTORS FOR DISPLAYING PRODUCT INFORMATION AND MODULAR SHELVING SYSTEMS COMPRISING THE SAME," the entirety of which is incorporated by reference herein. In other embodiments, each of the plurality of display units 118 is powered by a power distribution system. In some embodiments, the plurality of display units 118 is powered in another manner, such as via batteries, or the like.

Still referring to FIG. 1, in some embodiments, each of the plurality of display units 118 includes a projector unit and a display screen, as described in U.S. patent application Ser. No. 13/734,443, entitled "DISPLAY SHELF MODULES WITH PROJECTORS FOR DISPLAYING PRODUCT INFORMATION AND MODULAR SHELVING SYSTEMS COMPRISING THE SAME," the entirety of which is incorporated by reference herein. In other embodiments, one or more of the plurality of display units 118 includes a powered display screen, such as a TFT screen, an LCD screen, or the like. In some embodiments, the modular shelving system 100 may include one or more additional input or output components, such as a microphone (e.g., for receiving voice input from a consumer), a camera, a barcode reader, a speaker, or the like.

Figure 2:
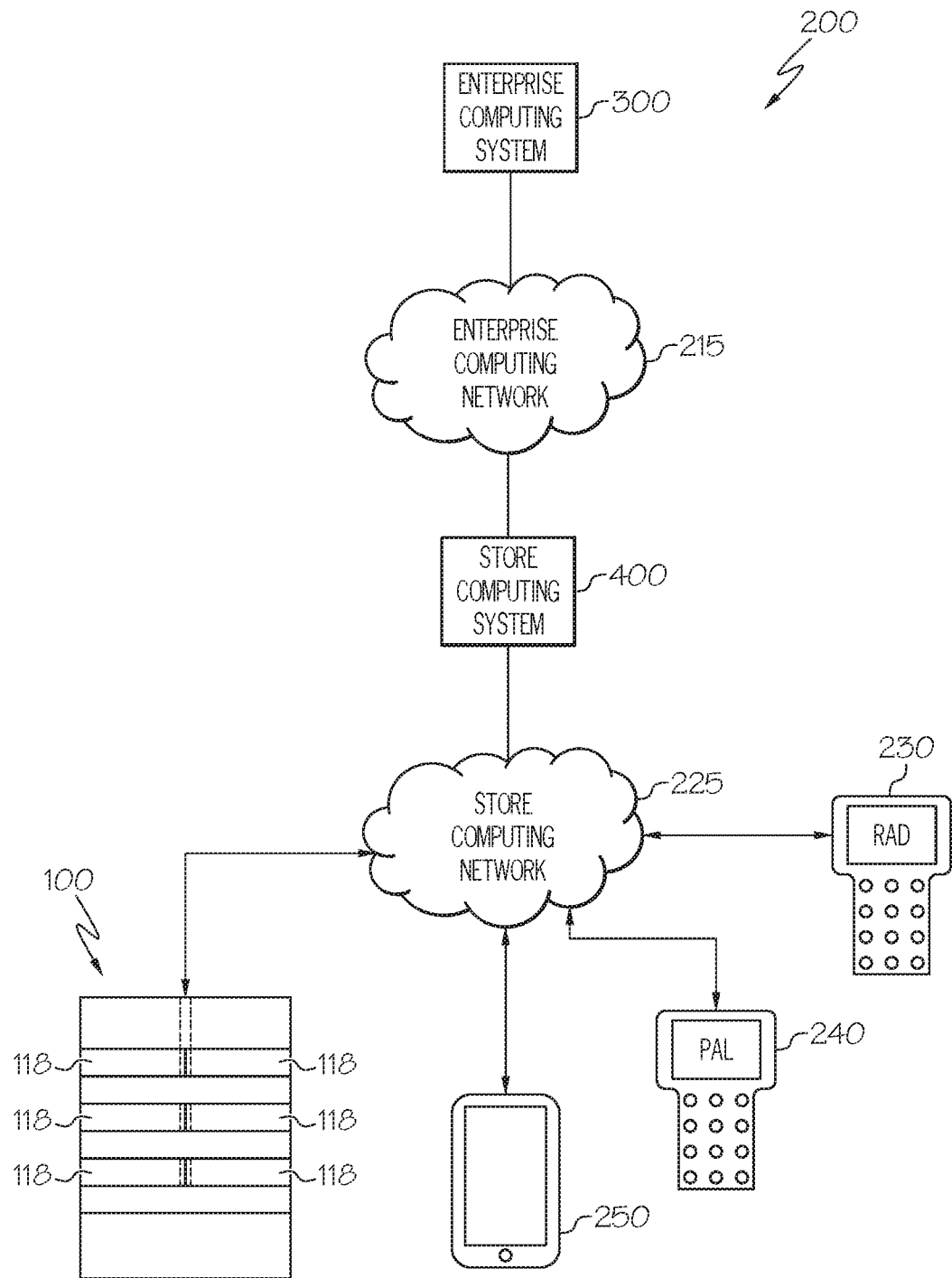
FIG. 2 schematically depicts a computing network for controlling shelf display units and for graphically presenting information on shelf display units, according to one or more embodiments shown and described herein.

Referring now to FIG. 2, one embodiment of a computing network 200 for controlling the plurality of display units 118 and for graphically presenting information on the plurality of display units 118 is schematically depicted. In this embodiment, the computing network 200 includes an enterprise computing system 300, an enterprise computing network 215, a store computing system 400, a store computing network 225, a retail associate device 230, a personal assistant and liaison device 240, a mobile computing device 250, and the plurality of display units 118.

Still referring to FIG. 2, the computing network 200 includes the enterprise computing network 215 for communicatively coupling the enterprise computing system 300 and the store computing system 400 such that data can be exchanged between the enterprise computing system 300 and the store computing system 400. The enterprise computing network 215 may include one or more computer networks (e.g., a wide area network, a personal area network, or a local area network), one or more cellular networks, one or more satellite networks, or combinations thereof. Accordingly, each of the enterprise computing system 300 and the store computing system 400 may be communicatively coupled to the enterprise computing network 215 via a wide area network, via a local area network, via a personal area network, via a cellular network, via a satellite network, or the like. Suitable wide area networks may include wired or wireless telecommunications networks that transmit information via coaxial cables, fiber-optic cables, radio-frequency transmission, or the like. Suitable local area networks may include wired ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 2, the enterprise computing network 215 communicatively couples the enterprise computing system 300 and the store computing system 400 such that data may be exchanged between the systems. In some embodiments, the enterprise computing system 300 stores enterprise data and interacts with a plurality of store computing systems associated with a plurality of stores. For example, the enterprise computing system 300 may be a central computing system operated by an owner of a grocery store chain or other retailer that owns a plurality of stores for selling products. Each of the plurality of store computing systems may be associated with a store affiliated with, owned, or operated by the grocery store chain or other retailer. Each of the plurality of store computing systems may receive information from the enterprise computing system 300 and use the received data, along with other data input to the store computing system by devices located at the store, to interface with and interact with any number of electronic components (e.g., cameras, point of sale devices, shelf displays, lighting systems, retail associate devices, personal assistant and liaison devices, etc.) at the store.

Still referring to FIG. 2, the enterprise computing system 300 stores enterprise data for distribution to a plurality of store computing systems, such as the store computing system 400. For example, the enterprise computing system 300 may store product data pertaining to products to be sold at one or more store locations, pricing data pertaining to the products to be sold at the one or more store locations, planogram data pertaining to the placement of products on shelves, label data to be displayed on shelf display units at the one or more store locations, multimedia content (e.g., pictures, video, sound, or the like), and the like. The enterprise computing system 300 may facilitate the interaction with and control of the plurality of display units 118 of the modular shelving system, as will be described below. Further components and functionality of the enterprise computing system 300 will be described with reference to FIG. 3 below.

Still referring to FIG. 2, the store computing system 400 may receive information from the enterprise computing system 300 and use the received data, along with other data input to the store computing system by devices located at the store, to interface with and interact with any number of electronic components (e.g., cameras, point of sale devices, shelf displays, lighting systems, retail associate devices, personal assistant and liaison devices, etc.) at the store. The store computing system 400 may also facilitate the interaction with and control of the plurality of display units 118 of the modular shelving system, as will be described below. Further components and functionality of the store computing system 400 will be described with reference to FIG. 3 below.

Still referring to FIG. 2, each of the enterprise computing system 300 and the store computing system 400 may be implemented as one or more computing devices, such as but not limited to server computers, personal computers, mobile computing devices, and the like. Furthermore, while each of the enterprise computing system 300 and the store computing system 400 are depicted in FIG. 2 as a single piece of hardware, embodiments are not so limited. For example, in some embodiments, the enterprise computing system 300, the store computing system 400, or both the enterprise computing system 300 and the store computing system 400 may be implemented as a plurality of computing devices interconnected by a network.

Still referring to FIG. 2, the computing network 200 includes the store computing network 225 for communicatively coupling the store computing system 400 to the retail associate device 230, the personal assistant and liaison device 240, the mobile computing device 250, and the plurality of display units 118, such that data can be exchanged between the components. The store computing network 225 may include one or more computer networks (e.g., a wide area network, a personal area network, or a local area network), one or more cellular networks, one or more satellite networks, or combinations thereof. Accordingly, each of the retail associate device 230, the personal assistant and liaison device 240, the mobile computing device 250, and the plurality of display units 118 may be communicatively coupled to the store computing network 225 via a wide area network, via a local area network, via a personal area network, via a cellular network, via a satellite network, or the like. Suitable wide area networks may include wired or wireless telecommunications networks that transmit information via coaxial cables, fiber-optic cables, radio-frequency transmission, or the like. Suitable local area networks may include wired ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 2, the store computing network 225 communicatively couples the store computing system 400, the retail associate device 230, the personal assistant and liaison device 240, the mobile computing device 250, and the plurality of display units 118 such that data may be exchanged between the components of the network. The store computing system 400 may receive data from and provide data to the retail associate device 230, the personal assistant and liaison device 240, the mobile computing device 250, and the plurality of display units 118.

Still referring to FIG. 2, in embodiments, the retail associate device 230 is a mobile computing device that may be used by a retail associate at a store to assist in the performance of a variety of functions, such as restocking shelves, resetting planograms, scanning product SKUs, retrieving products ordered by customers, and the like. The retail associate device 230 is a computing device that includes a processor, a data storage component, a non-transitory memory component, input/output hardware, network interface hardware, and a local interface. The processor of the retail associate device 230 includes a processing component configured to receive and execute instructions from the data storage component of the memory component. The memory component of the retail associate device 230 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. The data storage device or the memory component may be configured to store logic that causes the retail associate device 230 to perform the functions described herein when executed by the processor. The input/output hardware of the retail associate device 230 may include a display device (e.g., a touch screen, LCD screen, plasma screen, TFT screen, or the like), a tactile input device (e.g., a keypad, button, keyboard, mouse, or the like), a camera, a barcode reader, a microphone, a speaker, or the like, for receiving, sending, and/or presenting data. The network interface hardware of the retail associate device 230 may include any wired or wireless networking hardware, such as a modem, LAN port, wireless fidelity (Wi-Fi) card, WiMax card, mobile communications hardware, and/or other hardware for communicating with the store computing network 225 or with other devices. The local interface of the retail associate device 230 may be implemented as a bus or other interface to facilitate communication among the components of the retail associate device 230. While FIG. 2 only depicts a single retail associate device 230, some embodiments may include a plurality of retail associate devices, each of which may be carried and used by a different retail associate.

Still referring to FIG. 2, the personal assistant and liaison device 240 is a mobile computing device that may be used by a shopper at a store to perform a variety of functions, such as to scan and pay for products, to access shopping lists, or the like. The personal assistant and liaison device 240 is a computing device that includes a processor, a data storage component, a non-transitory memory component, input/output hardware, network interface hardware, and a local interface. The processor of the personal assistant and liaison device 240 includes a processing component configured to receive and execute instructions from the data storage component of the memory component. The memory component of the personal assistant and liaison device 240 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. The data storage device or the memory component may be configured to store logic that causes the personal assistant and liaison device 240 to perform the functions described herein when executed by the processor. The input/output hardware of the personal assistant and liaison device 240 may include a display device (e.g., a touch screen, LCD screen, plasma screen, TFT screen, or the like), a tactile input device (e.g., a keypad, button, keyboard, mouse, or the like), a camera, a barcode reader, a microphone, a speaker, or the like, for receiving, sending, and/or presenting data. The network interface hardware of the personal assistant and liaison device 240 may include any wired or wireless networking hardware, such as a modem, LAN port, wireless fidelity (Wi-Fi) card, WiMax card, mobile communications hardware, and/or other hardware for communicating with the store computing network 225 or with other devices. The local interface of the personal assistant and liaison device 240 may be implemented as a bus or other interface to facilitate communication among the components of the personal assistant and liaison device 240. While FIG. 2 only depicts a single personal assistant and liaison device 240, some embodiments may include a plurality of personal assistant and liaison devices, each of which may be carried and used by a different customer.

Still referring to FIG. 2, the mobile computing device 250 may be a mobile phone, a smartphone, a tablet, a personal digital assistant, a dedicated mobile media player, a mobile personal computer, a laptop computer, and/or any other mobile device including computing components. In some embodiments, the mobile computing device 250 may be used by a retail associate (e.g., when a retail associate uses the mobile computing device 250 to perform associate functions instead of the retail associate device 230). In some embodiments, the mobile computing device 250 may be used by a customer (e.g., when a customer uses the mobile computing device 250 instead of the personal assistant and liaison device 240 while shopping). In some embodiments, the mobile computing device 250 may be used by a retail associate or customer in addition to the retail associate device 230 or the personal assistant and liaison device 240. The mobile computing device 250 is a computing device that includes a processor, a data storage component, a non-transitory memory component, input/output hardware, network interface hardware, and a local interface. The processor of the mobile computing device 250 includes a processing component configured to receive and execute instructions from the data storage component of the memory component. The memory component of the mobile computing device 250 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. The data storage device or the memory component may be configured to store logic that causes the mobile computing device 250 to perform the functions described herein when executed by the processor. The input/output hardware of the mobile computing device 250 may include a display device (e.g., a touch screen, LCD screen, plasma screen, TFT screen, or the like), a tactile input device (e.g., a keypad, button, keyboard, mouse, or the like), a camera, a barcode reader, a microphone, a speaker, or the like, for receiving, sending, and/or presenting data. The network interface hardware of the mobile computing device 250 may include any wired or wireless networking hardware, such as a modem, LAN port, wireless fidelity (Wi-Fi) card, WiMax card, mobile communications hardware, and/or other hardware for communicating with the store computing network 225 or with other devices. The local interface of the mobile computing device 250 may be implemented as a bus or other interface to facilitate communication among the components of the mobile computing device 250. While FIG. 2 only depicts a single mobile computing device 250, some embodiments include a plurality of mobile computing devices, each communicatively coupled to the store computing system 400 by the store computing network 225.

While the computing network 200 depicted in FIG. 2 includes both the enterprise computing network 215 and the store computing network 225, it should be understood that in other embodiments, the enterprise computing system 300, the store computing system 400, the retail associate device 230, the personal assistant and liaison device 240, the mobile computing device, and the plurality of display units 118, may be communicatively coupled by a single computer network, or by additional computer networks other than the enterprise computing network 215 and the store computing network 225.

Figure 2A:
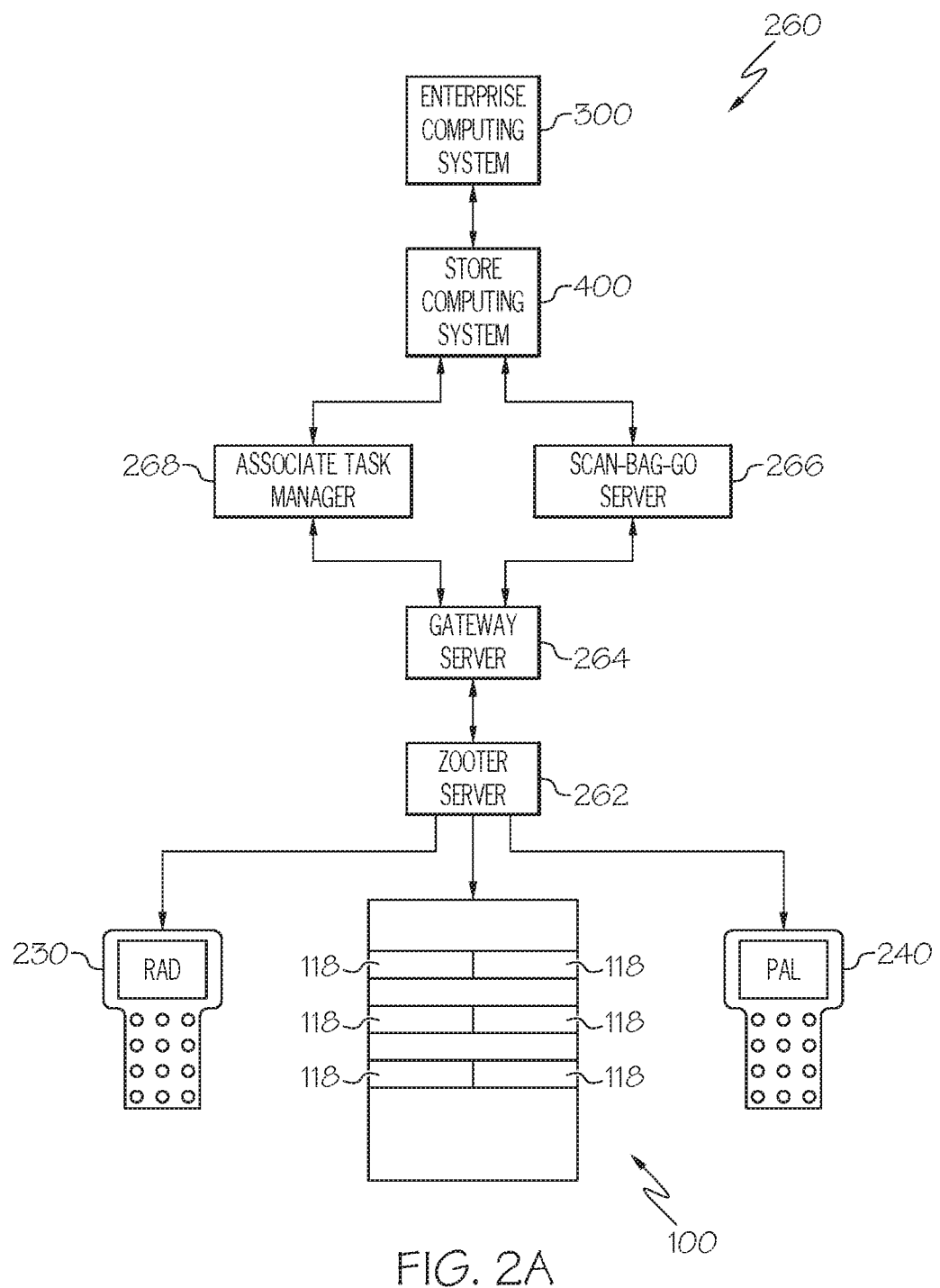
FIG. 2A schematically depicts an architecture of a computing network for controlling shelf display units and for graphically presenting information on shelf display units, according to one or more embodiments shown and described herein.

Referring now to FIG. 2A, an architecture of a computing network 260 is schematically depicted. The computing network 260 includes the enterprise computing system 300, the store computing system 400, the retail associate device 230, the personal assistant and liaison device 240, the plurality of display units 118, a zooter server 262, a gateway server 264, a scan-bag-go server 266, and an associate task manager server 268. Each of the zooter server 262, the gateway server 264, the scan-bag-go server 266, and the associate task manager server 268 includes a processor, a data storage component, a non-transitory memory component, input/output hardware, network interface hardware, and a local interface. Each of the components depicted in FIG. 2A are interconnected by one or more computing networks, which are not separately depicted. The associate task manager server 268 relays information between the retail associate device 230 and the store computing system 400. The scan-bag-go server 266 relays information between the personal assistant and liaison device 240 and the store computing system 400. The gateway server 264 relays information among the associate task manager server 268, the scan-bag-go server 266, and the zooter server 262. The zooter server 262 relays information among the gateway server 264, the plurality of display units 118, the personal assistant and liaison device 240, and the retail associate device 230. The specific architecture depicted in FIG. 2A does not limit the embodiments described herein. Other architectures may not include one or more of the depicted components, such as embodiments that do not include one or more of the intermediary components (e.g., the associate task manager server 268, the scan-bag-go server 266, the gateway server 264, or the zooter server 262).

Figure 3:
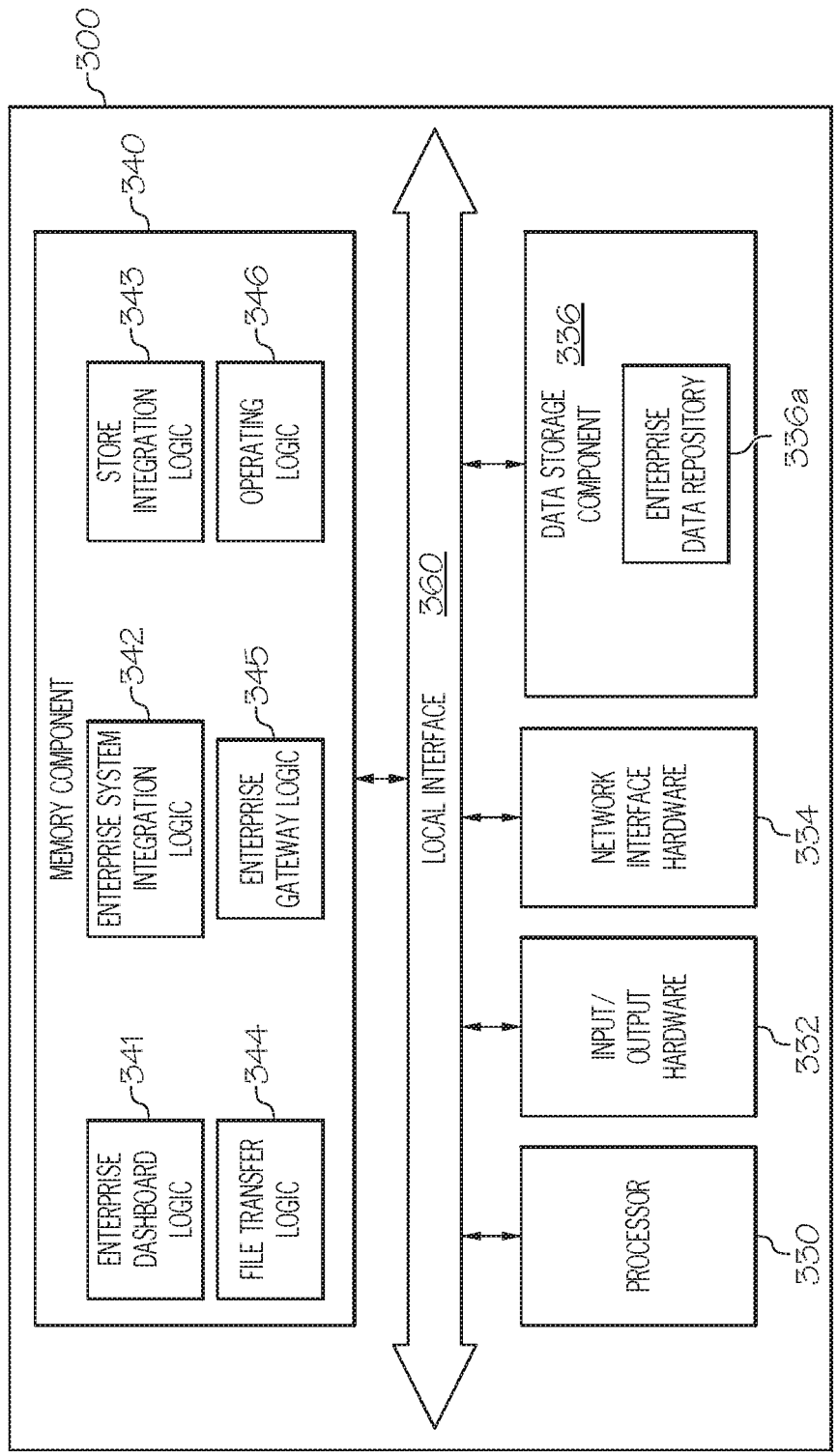
FIG. 3 schematically depicts an enterprise computing system, according to one or more embodiments shown and described herein.

FIG. 3 depicts additional details regarding the enterprise computing system 300 from FIG. 2. In some embodiments, the enterprise computing system 300 may be configured as a general purpose computer with the requisite hardware, software, and/or firmware. In some embodiments, the enterprise computing system 300 may be configured as a special purpose computer designed specifically for performing the functionality described herein.

As illustrated in FIG. 3, the enterprise computing system 300 includes a processor 330, input/output hardware 332, network interface hardware 334, a data storage component 336, and a non-transitory memory component 340. The memory component 340 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 340 may be configured to store enterprise dashboard logic 341, enterprise system integration logic 342, store integration logic 343, file transfer logic 344, enterprise gateway logic 345, and operating logic 346 (each of which may be embodied as a computer program, firmware, or hardware, as an example). A local interface 350 is also included in FIG. 3 and may be implemented as a bus or other interface to facilitate communication among the components of the enterprise computing system 300.

Still referring to FIG. 3, the processor 330 may include any processing component configured to receive and execute instructions (such as from the data storage component 336 and/or memory component 340). The input/output hardware 332 may include a monitor, keyboard, mouse, printer, camera, microphone, speaker, touch-screen, and/or other device for receiving, sending, and/or presenting data. The network interface hardware 334 may include any wired or wireless networking hardware, such as a modem, LAN port, wireless fidelity (Wi-Fi) card, WiMax card, mobile communications hardware, and/or other hardware for communicating with other networks (e.g., the enterprise computing network 215) and/or devices.

The data storage component 336 may reside local to and/or remote from the enterprise computing system 300 and may be configured to store one or more pieces of data for access by the enterprise computing system 300 and/or other components. As illustrated in FIG. 3, the data storage component 336 may store an enterprise data repository 336a, which may include product data pertaining to products to be sold at one or more store locations, pricing data pertaining to the products to be sold at the one or more store locations, planogram data pertaining to the placement of products on shelves, and label data to be displayed on shelf display units at the one or more store locations, multimedia content (e.g., pictures, video, sound, or the like). The enterprise data repository 336a may be stored in one or more data storage devices. In another embodiment, the enterprise computing system 300 may be coupled to a remote server or data storage device that includes at least some of the data in the enterprise data repository 336a. Other data may be stored in the data storage component 336 to provide support for functionalities described herein.

Still referring to FIG. 3, the memory component 340 includes the enterprise dashboard logic 341, the enterprise system integration logic 342, the store integration logic 343, the file transfer logic 344, the enterprise gateway logic 345, and the operating logic 346. The enterprise dashboard logic 341 includes machine readable instructions that when executed by the processor 330 cause the enterprise computing system 300 to display a graphical user interface for managing the enterprise data repository 336a. In some embodiments, the graphical user interface may allow for the management or adjustment of data to be transmitted to the store computing system 400 or to be displayed one the plurality of display units 118. In some embodiments, the graphical user interface may allow for control of the content displayed on the plurality of display units 118. The enterprise system integration logic 342 includes machine readable instructions that when executed by the processor 330 cause the enterprise computing system 300 to process events from other enterprise services. In some embodiments, the enterprise system integration logic 342 receives and handles planogram events, such as the updating of planograms. The store integration logic 343 includes machine readable instructions that when executed by the processor 330 cause the enterprise computing system 300 to transmit messages or data to the store computing system 400 or receive messages or data from the store computing system 400. The file transfer logic 344 includes machine readable instructions that when executed by the processor 330 cause the enterprise computing system 300 to transfer files, such as video or other multimedia files to the store computing system 400. In some embodiments, the file transfer logic 344 includes an IBM MQ extension that facilitates the transfer of video files to the store computing system 400 so that the store computing system 400 causes the video files to be displayed on at least one of the plurality of display units 118. The enterprise gateway logic 345 includes machine readable instructions that when executed by the processor 330 cause the enterprise computing system 300 to transmit messages to or receive messages from the store computing system 400. In some embodiments, the enterprise gateway logic 345 may transmit and receive all messages to and from the store computing system 400, but may forward or receive only messages pertaining to the plurality of display units 118 to the store integration logic 343. The operating logic 346 may include an operating system and/or other software for managing components of the enterprise computing system 300.

It should be understood that the components illustrated in FIG. 3 are merely exemplary and are not intended to limit the scope of this disclosure. More specifically, while the components in FIG. 3 are illustrated as residing within the enterprise computing system 300, this is a nonlimiting example. In some embodiments, one or more of the components may reside external to the enterprise computing system 300.

Figure 4:
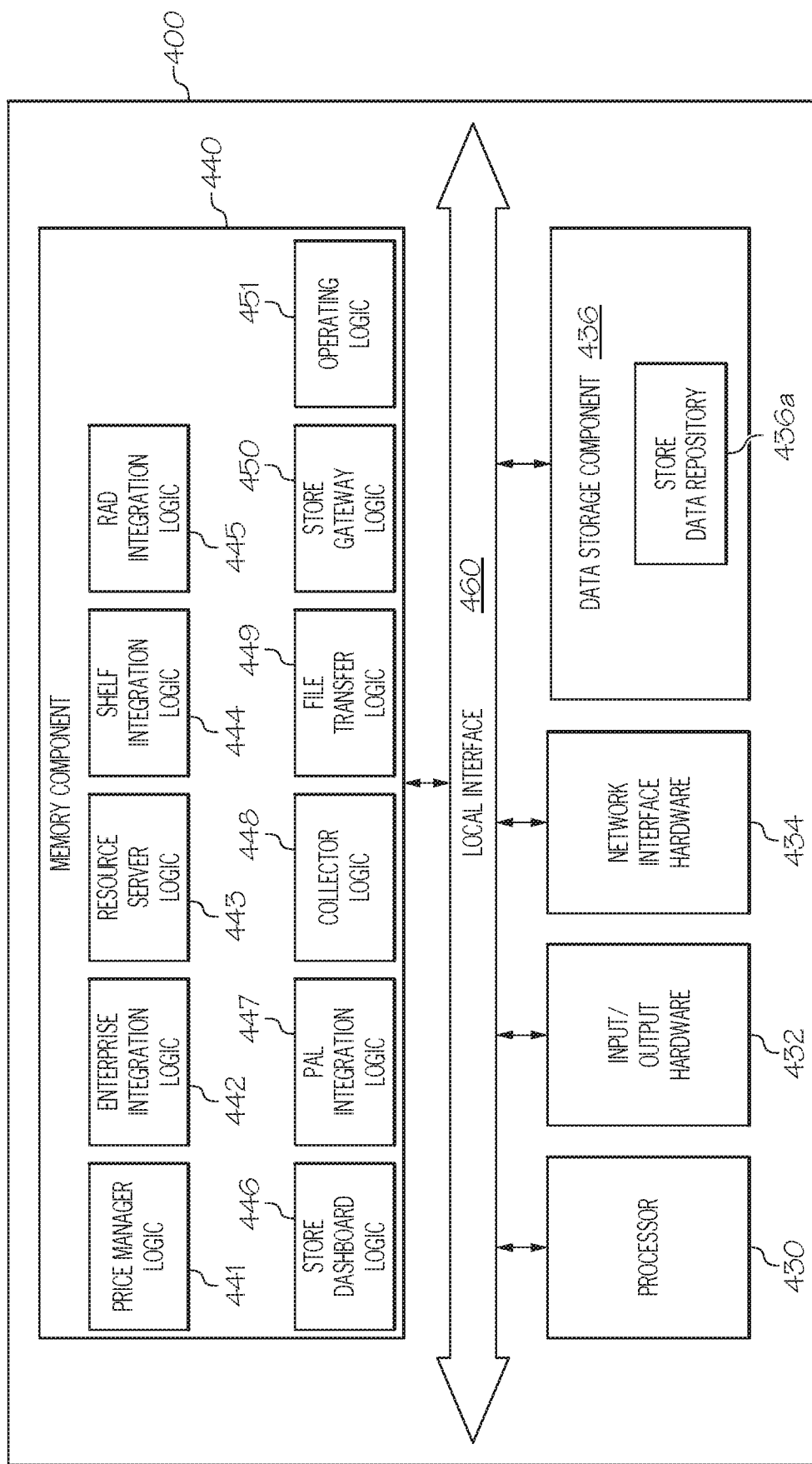
FIG. 4 schematically depicts a store computing system, according to one or more embodiments shown and described herein.

FIG. 4 depicts additional details regarding the store computing system 400 from FIG. 2. In some embodiments, the store computing system 400 may be configured as a general purpose computer with the requisite hardware, software, and/or firmware. In some embodiments, the store computing system 400 may be configured as a special purpose computer designed specifically for performing the functionality described herein.

As illustrated in FIG. 4, the store computing system 400 includes a processor 430, input/output hardware 432, network interface hardware 434, a data storage component 436, and a non-transitory memory component 440. The memory component 440 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 440 may be configured to store price manager logic 441, enterprise integration logic 442, resource server logic 443, shelf integration logic 444, RAD integration logic 445, store dashboard logic 446, PAL integration logic 447, collector logic 448, file transfer logic 449, store gateway logic 450, and operating logic 451 (each of which may be embodied as a computer program, firmware, or hardware, as an example). A local interface 460 is also included in FIG. 4 and may be implemented as a bus or other interface to facilitate communication among the components of the store computing system 400.

Still referring to FIG. 4, the processor 430 may include any processing component configured to receive and execute instructions (such as from the data storage component 436 and/or memory component 440). The input/output hardware 432 may include a monitor, keyboard, mouse, printer, camera, microphone, speaker, touch-screen, and/or other device for receiving, sending, and/or presenting data. The network interface hardware 434 may include any wired or wireless networking hardware, such as a modem, LAN port, wireless fidelity (Wi-Fi) card, WiMax card, mobile communications hardware, and/or other hardware for communicating with other networks (e.g., the enterprise computing network 215 or the store computing network 225) and/or devices.

The data storage component 436 may reside local to and/or remote from the store computing system 400 and may be configured to store one or more pieces of data for access by the store computing system 400 and/or other components. As illustrated in FIG. 4, the data storage component 436 may store a store data repository 436a, which may include product data pertaining to products to be sold at the store, pricing data pertaining to the products to be sold at the store, planogram data pertaining to the placement of products on shelves at the store, and label data to be displayed on shelf display units at the store, multimedia content (e.g., pictures, video, or the like). The store data repository 436a may be stored in one or more data storage devices. In another embodiment, the store computing system 400 may be coupled to a remote server or data storage device that includes at least some of the data in the store data repository 436a. Other data may be stored in the data storage component 436 to provide support for functionalities described herein.

Still referring to FIG. 4, the memory component 440 includes the price manager logic 441, the enterprise integration logic 442, the resource server logic 443, the shelf integration logic 444, the RAD integration logic 445, the store dashboard logic 446, the PAL integration logic 447, the collector logic 448, the file transfer logic 449, the store gateway logic 450, and the operating logic 451. The collector logic 448 includes machine readable instructions that when executed by the processor 430 cause the store computing system 400 to collect data from a number of resources (e.g., price data, point of sale information, label information, etc.) and transmits electronic shelf label events to the price manager logic. The price manager logic 441 includes machine readable instructions that when executed by the processor 430 cause the store computing system 400 to process the electronic shelf label events transmitted by the collector logic 448. The enterprise integration logic 442 includes machine readable instructions that when executed by the processor 430 cause the store computing system 400 to transmit messages or data to the enterprise computing system 300 or receive messages or data from the enterprise computing system 300. The resource server logic 443 includes machine readable instructions that when executed by the processor 430 cause the store computing system 400 to render image or video data, such as tags, banners, tag templates, or video content to be displayed on the plurality of display units 118. The shelf integration logic 444 sends messages or content to the plurality of display units 118 for display by the plurality of display units 118. In some embodiments, the shelf integration logic 444 may be external to the store computing system 400. The RAD integration logic 445 includes machine readable instructions that when executed by the processor 430 cause the store computing system 400 to receive messages from and transmits messages to the retail associate device 230. The store dashboard logic 446 includes machine readable instructions that when executed by the processor 430 cause the store computing system 400 to display a graphical user interface for managing the store data repository 436a. In some embodiments, the graphical user interface may allow for the management or adjustment of data to be displayed one the plurality of display units 118. In some embodiments, the graphical user interface may allow for control of the content displayed on the plurality of display units 118. The PAL integration logic 447 includes machine readable instructions that when executed by the processor 430 cause the store computing system 400 to receive messages from and transmit messages to the personal assistant and liaison device 240. The file transfer logic 449 includes machine readable instructions that when executed by the processor 430 cause the store computing system 400 to receive files, such as video or other multimedia files from the enterprise computing system 300. In some embodiments, the file transfer logic 449 includes an IBM MQ extension that facilitates the transfer of video files to the store computing system 400. The store gateway logic 450 includes machine readable instructions that when executed by the processor 430 cause the store computing system 400 to transmit messages to or receive messages from the enterprise computing system 300. In some embodiments, the store gateway logic 450 may transmit and receive all messages to and from the enterprise computing system 300, but may forward or receive only messages pertaining to the plurality of display units 118 to the enterprise integration logic 442. The operating logic 451 may include an operating system and/or other software for managing components of the store computing system 400.

It should be understood that the components illustrated in FIG. 4 are merely exemplary and are not intended to limit the scope of this disclosure. More specifically, while the components in FIG. 4 are illustrated as residing within the store computing system 400, this is a nonlimiting example. In some embodiments, one or more of the components may reside external to the store computing system 400.

Figure 5:
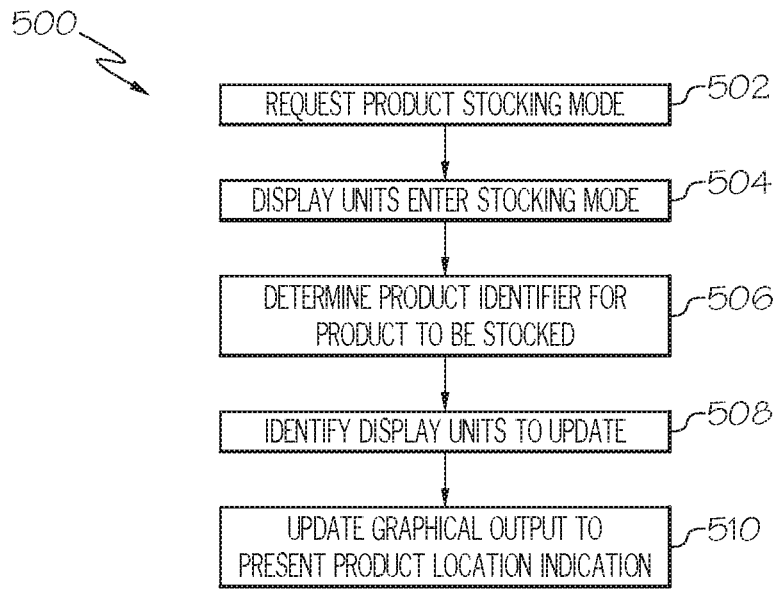
FIG. 5 graphically illustrates a computer-implemented method of graphically presenting a product location indication on one or more display units coupled to shelves of a modular shelving system, according to one or more embodiments shown and described herein.

Referring now to FIG. 5 (and FIGS. 1 and 2), a flowchart that graphically illustrates a method 500 of graphically presenting a product location indication on at least one of the plurality of display units 118 is provided. As will be apparent from the description below, the method 500 may facilitate an associate's stocking of products on the plurality of shelves 116 by presenting a product location indication on the plurality of display units 118, such that the plurality of display units 118 provide a visual cue for the associate as to the appropriate location to stock the product on the plurality of shelves 116. Such a visual cue may allow the associate to quickly and accurately identify the appropriate location to stock the product, thereby increasing the speed and accuracy of stocking products on the plurality of shelves 116.

Still referring to FIG. 5 (and FIGS. 1 and 2), at block 502, input indicative of a request that the plurality of display units 118 enter a product stocking mode may be received. For example, in some embodiments, an associate tasked with stocking a particular product on the plurality of shelves 116 may provide input indicative of the request for the plurality of display units 118 to enter the product stocking mode via manipulation of a touchscreen or tactile input device of the retail associate device 230. In other embodiments, the input indicative of the request for the plurality of display units 118 to enter the product stocking mode may be received via manipulation of a touchscreen or tactile input device of the mobile computing device 250. In other embodiments, the input indicative of the request for the plurality of display units 118 to enter the product stocking mode may be received from the plurality of display units 118, such as in embodiments in which the plurality of display units 118 include a touchscreen interface or include tactile input hardware, such as buttons, keypads, or the like. In some embodiments, the input indicative of the request for the plurality of display units 118 to enter the product stocking mode may be voice input received by a microphone of the retail associate device 230, the mobile computing device 250, or the plurality of display units 118. In some embodiments, the input indicative of the request for the plurality of display units 118 to enter the product stocking mode may be transmitted by the retail associate device 230, the mobile computing device 250, or the plurality of display units 118 to the store computing system 400 via the store computing network 225. In such embodiments, the store computing system 400 may receive the input indicative of the request for the plurality of display units 118 to enter the product stocking mode.

Still referring to FIG. 5 (and FIGS. 1 and 2), at block 504, in response to receiving the input indicative of the request to enter product stocking mode, a graphical output of the plurality of display units 118 may be changed to indicate that the plurality of display units 118 are in a stocking mode. In some embodiments in which the store computing system 400 receives the input indicative of the request for the plurality of display units 118 to enter the product stocking mode, the store computing system 400 may transmit a message to the plurality of display units 118 that causes the graphical output of the plurality of display units 118 to change. In some embodiments, the plurality of display units 118 may display a solid color (e.g., black, gray, blue, or the like) when in stocking mode. In other embodiments, the plurality of display units 118 may provide a different graphical indication that the plurality of display units 118 are in the stocking mode, such as by displaying the words "STOCKING MODE," or another alphanumeric graphical output. In some embodiments, the graphical output of the plurality of display units 118 may not be changed to indicate that the plurality of display units 118 are in a stocking mode, such as embodiments that do not change the graphical output of the plurality of display units 118 until after the a product identifier corresponding to a product to be stocked is determined. In some embodiments, only the graphical output of a subset of the plurality of display units 118 is changed in response to receiving the request to enter product stocking mode.

Still referring to FIG. 5 (and FIGS. 1 and 2), at block 506, after receiving input indicative of a request that the plurality of display units 118 enter the product stocking mode, a product identifier corresponding to a product to be stocked on the plurality of shelves 116 may be determined. In some embodiments, the product identifier may be determined by scanning a barcode (e.g., a UPC code, a QR code, a one dimensional bar code, a two-dimensional bar code, or the like) on a product to be stocked on the plurality of shelves 116 and determining the product identifier based on the scanned barcode. In some embodiments, the product identifier may be determined by scanning a barcode displayed on the plurality of display units 118, such as in embodiments in which at least one of the plurality of display units 118 displays a barcode proximate to a corresponding product stocked on the shelf above or below the displayed barcode. In some embodiments, the barcode may be scanned with a barcode reader or camera of the retail associate device 230 operated by an associate tasked with stocking the product in the appropriate location on the plurality of shelves 116. In some embodiments, the barcode may be scanned with a barcode reader or camera of the mobile computing device 250 operated by an associate tasked with stocking the product in the appropriate location on the plurality of shelves 116. In some embodiments, the barcode may be scanned with a barcode reader or camera mounted on or near the plurality of shelves 116, such as in embodiments in which a barcode reader or camera is integrated with or attached to the plurality of display units 118. In embodiments in which the barcode of the product is scanned, the product identifier may be determined by decoding the scanned barcode. In some embodiments, the product identifier is a sequence of digits (e.g., the sequence of digits represented by a UPC code), though embodiments are not limited thereto. In some embodiments, the product identifier may be determined by capturing an image of the product to be stocked and utilizing object recognition software to recognize the product from the image and determine the product identifier based on the recognized image. In some embodiments, the product identifier may be input via input hardware other than a barcode reader or camera, such as a touchscreen, a keypad, or a keyboard. In some embodiments, the product identifier may be voice input (e.g., voice input indicative of a description of a product, a product name, a UPC code associated with the product, or the like) may be received by a microphone of the retail associate device 230, the mobile computing device 250, or the plurality of display units 118. In some embodiments, the product identifier may be determined by the retail associate device 230, the mobile computing device 250, or the plurality of display units 118 and transmitted by the retail associate device 230, the mobile computing device 250, or the plurality of display units 118 to the store computing system 400 via the store computing network 225. In some embodiments, the retail associate device 230, the mobile computing device 250, or the plurality of display units 118 concurrently or separately transmit a request to the store computing system 400 to display on at least one of the plurality of display units 118 where the product associated with the product identifier should be stocked. In embodiments in which the product identifier is transmitted to the store computing system 400 via the store computing network 225, the store computing system 400 (e.g., the RAD integration logic 445 of the store computing system 400 in some embodiments) receives the product identifier. In other embodiments, the store computing system 400 may determine the product identifier based on image data transmitted from the retail associate device 230, the mobile computing device 250, or the plurality of display units 118.

Still referring to FIG. 5 (and FIGS. 1 and 2), at block 508, in response to determining the product identifier corresponding to the product to be stocked on the plurality of shelves 116, at least one of the plurality of display units 118 to update may be identified. In some embodiments, the display units to be updated may be identified by the store computing system 400 based on planogram data stored in the store data repository 436a or planogram data stored in the enterprise data repository 336a that maps the product identifier to one or more of the plurality of display units 118.

Still referring to FIG. 5 (and FIGS. 1 and 2), at block 510, in response to identifying the one or more display units to update, a graphical output of the one or more display units identified to be updated in block 508 may be updated to present a product location indication. In some embodiments, the product location indication may be indicative of a location on a shelf above or below the one or more display units where the product is to be stocked. In some embodiments, the graphical output of one or more of the identified display units may be updated to include an arrow pointing to the location on the plurality of shelves 116 that the product is to be placed. In some embodiments, the graphical output of one or more of the identified display units may be updated to include an animation indicative of the location on the plurality of shelves 116 that the product is to be placed. In some embodiments, a color of the background of one or more of the identified display units may be changed relative to the background of the display units that are not associated with the product to be stocked. In other embodiments, a graphical output of the identified display units may be updated in a different manner to graphically distinguish the display units associated with the product to be stocked from the other display units. By presenting the product location indication on the appropriate display unit or display units, an associate's stocking of the product on the plurality of shelves 116 may be facilitated by providing the associate with a visual cue that allows the associate to quickly and accurately identify the appropriate location to stock the product, thereby increasing the speed and accuracy of stocking products on the plurality of shelves 116. In some embodiments, the graphical output of the one or more display units identified to be updated may be updated to present the product location indication in response to a message and/or content transmitted from the store computing system 400 to the one or more display units 118 via the store computing network 225. In some embodiments, the resource server logic 443 of the store computing system 400 may render the image or video data to be displayed on the plurality of display units 118 as the updated graphical output. In some embodiments, the shelf integration logic 444 of the store computing system 400 sends the message or content to the plurality of display units 118 that cause the graphical output to be updated. In some embodiments, an audible product location indication may be provided by a speaker positioned near the location where the product is to be stocked In some embodiments, after the graphical output of the one or more display units is updated, an update confirmation may be generated and transmitted. For example, the store computing system 400 may generate such an update confirmation message and transmit the message to the retail associate device 230 or the mobile computing device 250.

Although blocks 502-510 have been described as being separate tasks, in other embodiments, the blocks may be combined or omitted. Further, while the tasks of blocks 502-510 have been described as being performed in a particular order, in other embodiments, the tasks may be performed in a different order.

Figure 6:
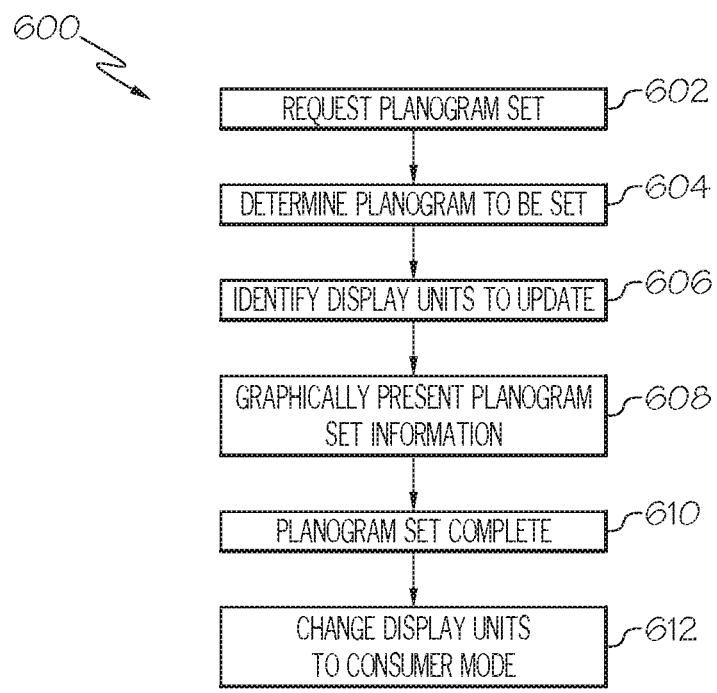
FIG. 6 graphically illustrates a computer-implemented method of graphically displaying planogram set information on one or more display units coupled to shelves of a modular shelving system during a planogram set, according to one or more embodiments shown and described herein.

Referring now to FIG. 6 (and FIGS. 1 and 2), a flowchart that graphically illustrates a method 600 of graphically displaying planogram set information during a planogram set is provided. As will be apparent from the description below, the method 600 may facilitate the setting of one or more products on the plurality of shelves 116 according to a planogram that maps one or more products to particular locations on the plurality of shelves 116. For example, by graphically displaying planogram set information, a visual cue may be provided (e.g., a visual cue as to the placement of products or changes that need to be made to the placement of products) to an associate tasked with setting the products according to the planogram. Such visual cues may allow the associate to quickly and accurately identify the appropriate location to set products or the changes that need to be made to the placement of the products according to the planogram, thereby increasing the speed and accuracy of setting products on the plurality of shelves 116 according to a particular planogram.

Still referring to FIG. 6 (and FIGS. 1 and 2), at block 602, input indicative of a request to set a planogram may be received. For example, in some embodiments, an associate tasked with setting one or more products on the plurality of shelves 116 according to a particular planogram may provide input indicative of the request to set a planogram via manipulation of a touchscreen or tactile input device of the retail associate device 230. In other embodiments, the input indicative of the request to set a planogram may be received via manipulation of a touchscreen or tactile input device of the mobile computing device 250. In other embodiments, the input indicative of the request to set a planogram may be received from the plurality of display units 118, such as in embodiments in which the plurality of display units 118 include a touchscreen interface or include tactile input hardware, such as buttons, keypads, or the like. In some embodiments, the input indicative of the request to set a planogram may be transmitted by the retail associate device 230, the mobile computing device 250, or the plurality of display units 118 to the store computing system 400 via the store computing network 225. In such embodiments, the store computing system 400 may receive the input indicative of the request to set a planogram. In some embodiments, the request to set a planogram may be generated by the store computing system 400 or the enterprise computing system 300, such as in embodiments in which a user indicates a desire to set a planogram via a graphical user interface associated with the store computing system 400 or the enterprise computing system 300.

Still referring to FIG. 6 (and FIGS. 1 and 2), at block 604, in response to receiving the request to set a planogram, the particular planogram to be set is determined. In some embodiments, the planogram to be set is retrieved from the store data repository 446a or the enterprise data repository 336a (e.g., when the enterprise computing system 300 transmits the planogram to be set to the store computing system 400). In some embodiments, the particular planogram to be set may be determined: by scanning a barcode of a product to be set according to the planogram (e.g., in the manner described above with respect to block 506), by scanning a barcode or other product identifier displayed on the plurality of display units 118 associated with a product to be set according to the planogram, by inputting the planogram to be set, or the like. In embodiments in which the planogram to be set is determined based on scanning a barcode of a product or a barcode displayed on the plurality of display units 118, the store computing system 400 and/or the enterprise computing system 300 may retrieve the planogram to be set from the store data repository 446a and/or the enterprise data repository 336a based on a product identifier determined from the scanned barcode.

Still referring to block 604, some embodiments may determine the planogram to be set based on sales plans (e.g. what is on sale, what is not on sale, etc.), planogram information, inventory information, past sales data (e.g., the velocity of sales of one or more items), or the like, retrieved from the store data repository 446a and/or the enterprise data repository 336a. For example, in some embodiments, the enterprise computing system 300 may determine a planogram to be set at a store based on sales plans, planogram information, inventory information, past sales data, or the like contained in the enterprise data repository 336a. The determined planogram may then be transmitted from the enterprise computing system 300 to the store computing system 400, such that the store computing system 400 can effectuate the setting of the determined planogram. By dynamically determining the planogram to be set based on sales plans, sales data, and the like, an algorithm may be able to determine how best to place items on the plurality of shelves for upcoming sales events. Some embodiments may not include block 602 such as embodiments in which a single planogram includes the mapping of product placement to all of the plurality of shelves 116 located within a single store.

Still referring to FIG. 6 (and FIGS. 1 and 2), at block 606, in response to determining the planogram to be set, at least one of the plurality of display units 118 to be updated may be identified. In some embodiments, the display units to be updated may be identified by the store computing system 400 based on planogram data stored in the store data repository 436a or planogram data stored in the enterprise data repository 336a that maps the planogram to be set to one or more of the plurality of display units 118 coupled to the plurality of shelves 116 on which the products associated with the planogram are to be set.

Still referring to FIG. 6 (and FIGS. 1 and 2), at block 608, in response to identifying the one or more display units to update, a graphical output of the one or more display units identified to be updated in block 606 may be updated to graphically present planogram set information associated with the identified planogram to be set. In some embodiments, the graphically presented planogram set information may provide a visual indication of changes to be made to the current placement of the products on the plurality of shelves 116 such that the products will be placed on the plurality of shelves 116 according to the planogram to be set. In some embodiments, the changes to be made to the current placement of products may be determined by comparing the planogram to be set with a prior planogram located in the store data repository 446a or the enterprise data repository 336a. The graphically presented planogram set information may include different colors associated with actions to be taken (e.g., displaying green where a product is to be added, displaying red where a product is to be removed, or the like). In some embodiments, the graphically presented planogram set information may include an animation such as a visual contraction or expansion of an area where a product is to be set according to the planogram. In some embodiments, the graphically presented planogram set information may be indicative of a location on a shelf above or below the one or more display units where a particular product is to be set according to the planogram. In some embodiments, the graphically presented planogram set information may include an arrow pointing to the location on the plurality of shelves 116 that a particular product is to be set according to the planogram. In some embodiments, the graphical output of the one or more display units identified to be updated may be updated to present the planogram set information in response to a message and/or content transmitted from the store computing system 400 to the one or more display units 118 via the store computing network 225. In some embodiments, the resource server logic 443 of the store computing system 400 may render the image or video data to be displayed on the plurality of display units 118 as the updated graphical output. In some embodiments, the shelf integration logic 444 of the store computing system 400 sends the message or content to the plurality of display units 118 that cause the graphical output to be updated.

Still referring to FIG. 6 (and FIGS. 1 and 2), at block 610, input indicative of a completion of the planogram set may be received. For example, in some embodiments, an associate tasked with setting products on the plurality of shelves 116 according to the particular planogram may provide input indicative of the completion of the planogram set via manipulation of a touchscreen or tactile input device of the retail associate device 230 when the associate has completed setting the planogram. In other embodiments, the input indicative of the completion of the planogram set may be received via manipulation of a touchscreen or tactile input device of the mobile computing device 250. In other embodiments, the input indicative of the completion of the planogram set may be received from the plurality of display units 118, such as in embodiments in which the plurality of display units 118 include a touchscreen interface or include tactile input hardware, such as buttons, keypads, or the like. In some embodiments, the input indicative of the completion of the planogram set may be transmitted by the retail associate device 230, the mobile computing device 250, or the plurality of display units 118 to the store computing system 400 via the store computing network 225. In such embodiments, the store computing system 400 may receive the input indicative of the completion of the planogram set.

Still referring to FIG. 6 (and FIGS. 1 and 2), at block 612, in response to receiving the input indicative of the completion of the planogram set, the plurality of display units 118 may be changed to a consumer mode. In some embodiments, when the plurality of display units 118 are changed to the consumer mode, a graphical output of the plurality of display units 118 presents graphical consumer information, such as product tags, price tags, coupons, discounts, or the like.

Although blocks 602-612 have been described as being separate tasks, in other embodiments, the blocks may be combined or omitted. Further, while the tasks of blocks 602-612 have been described as being performed in a particular order, in other embodiments, the tasks may be performed in a different order.

Figure 7:
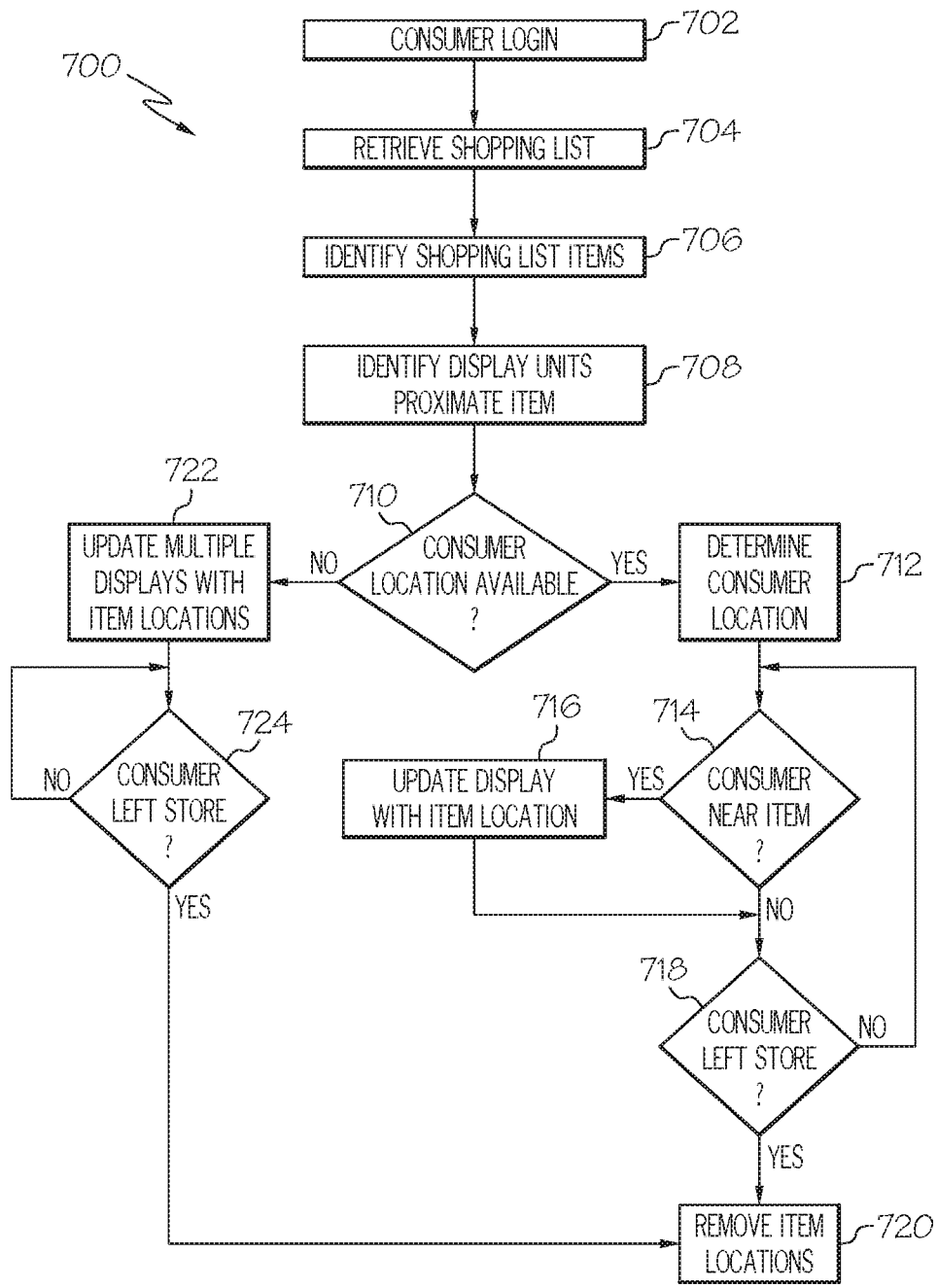
FIG. 7 graphically illustrates a computer-implemented method of graphically presenting shopping list item locations on one or more display units coupled to shelves of a modular shelving system, according to one or more embodiments shown and described herein.

Referring now to FIG. 7 (and FIGS. 1 and 2), a flowchart that graphically illustrates a method 700 of graphically presenting shopping list item locations on one or more of the plurality of display units 118 coupled to the plurality of shelves 116 of the modular shelving system 100 is provided. As will be apparent from the description below, the method 700 may help a consumer quickly and accurately locate items on the consumer's shopping list by displaying shopping list item locations on one or more of the plurality of display units 118 so that the consumer's attention is drawn to the location on the plurality of shelves 116 at which the item is located.

Still referring to FIG. 7 (and FIGS. 1 and 2), at block 702, a consumer may login or otherwise authenticate with the system. In some embodiments, the consumer may login by providing input to the personal assistant and liaison device 240, such as by entering a username and password on a keypad of the device or by scanning a loyalty card associated with the consumer with a barcode reader of the device. In some embodiments, the consumer may login with the mobile computing device 250, such as by logging into a smartphone application provided by the store. In some embodiments, the consumer login may cause the store computing system 400 or the enterprise computing system 300 to receive a consumer login message that includes a consumer identifier. The store computing system 400 or the enterprise computing system 300 may provide a message to one or more components of the store computing system 400 or the enterprise computing system 300 including the consumer identifier.

Still referring to FIG. 7 (and FIGS. 1 and 2), at block 704, a shopping list associated with the consumer identifier is retrieved. In some embodiments, the store computing system 400 may receive the customer identifier from the personal assistant and liaison device 240 or the mobile computing device 250, the store computing system 400 may request the shopping list associated with the customer identifier from the enterprise computing system 300, and the enterprise computing system 300 may transmit the shopping list associated with the customer identifier to the store computing system 400 to be used for graphically presenting shopping list item locations on one or more of the plurality of display units 118 as described below. In other embodiments, the shopping list may be retrieved in another manner, such as directly from the personal assistant and liaison device 240 or directly from the mobile computing device 250.

Still referring to FIG. 7 (and FIGS. 1 and 2), at block 706, one or more items are identified from the shopping list. In some embodiments, the identified items are a list of product identifiers, such as UPC codes associated with the shopping list. The items included in the list are typically added to the list previously by the consumer, such as by a web interface, with the mobile computing device 250, or the like.

Still referring to FIG. 7 (and FIGS. 1 and 2), at block 708, the display units proximate the items are identified. In some embodiments, one or more display units proximate each of the items are identified. In some embodiments, the display units proximate a shopping list item may be identified by the store computing system 400 based on planogram data stored in the store data repository 436a or planogram data stored in the enterprise data repository 336a that maps the shopping list item to one or more of the plurality of display units 118 coupled to the plurality of shelves 116 on which the shopping list item is located.

Still referring to FIG. 7 (and FIGS. 1 and 2), at block 710, it is determined whether a location of the consumer is available. If the consumer location is available at block 710, the consumer location is determined at block 712. In some embodiments, the consumer location is determined based on a signal received from a global positioning system receiver embedded in the personal assistant and liaison device 240 or the mobile computing device 250. In other embodiments, the consumer location is determined based on a location of a receiver that wirelessly communicates with the personal assistant and liaison device 240 or the mobile computing device 250. In some embodiments, the location of the consumer is mapped to a store coordinate system, such as a store coordinate system that is associated with planogram data so that the consumer location can be mapped to shelves or display units proximate the consumer location. The consumer location may be determined in other ways, such as based on image data from one or more imaging devices coupled to the mobile computing device 250, the personal assistant and liaison device 240, or the store computing system 400.

Still referring to FIG. 7 (and FIGS. 1 and 2), at block 714, it is determined whether the consumer is near a shopping list item. In some embodiments, the consumer is determined to be near a shopping list item based on the consumer location, such as when the consumer is determined to be near a shopping list item when the consumer location is within a threshold distance of a display unit identified as proximate the shopping list item. In other embodiments, the consumer is determined to be near a shopping list item when the consumer location is determined to be in the same aisle within the store as the shopping list item.

Still referring to FIG. 7 (and FIGS. 1 and 2), if the consumer is determined to be near the shopping list item, one or more of the plurality of display units 118 identified as proximate the shopping list item at block 708 may be updated to graphically present a shopping list item location at block 716. In some embodiments, the shopping list item location may be a color, a graphic, an arrow, or the like. In other embodiments, the shopping list item location may be an animation or video. Graphically presenting the shopping list item location on the one or more display units may draw the consumer's attention to the location on the plurality of shelves 116 at which the shopping list item is located, thereby aiding the consumer to quickly and accurately locate items on the consumer's shopping list. In some embodiments, an audible shopping item list indication may be provided by a speaker positioned near the location where the shopping list item is located.

Still referring to FIG. 7 (and FIGS. 1 and 2), at block 718, it is determined whether the consumer has left the store. In some embodiments, the consumer is determined to have left the store based on a comparison of the current consumer location to a grid of the store area. If the consumer has not left the store, the method returns to block 714 to determine whether the consumer is near a shopping list item. If the consumer is determined to have left the store at block 718, any of the plurality of display units 118 that were updated to graphically present shopping list item locations may be updated at block 720 to remove the shopping list item locations, such as by updating the displays to return to a consumer mode in which the graphical output of the plurality of display units 118 presents graphical consumer information, such as product tags, price tags, coupons, discounts, or the like.

Still referring to FIG. 7 (and FIGS. 1 and 2), if the consumer location is not available at block 710, one or more display units associated with multiple shopping list items may be updated to graphically present the shopping list item locations at block 722. For example, in some embodiments, one or more of the plurality of display units 118 proximate each shopping list item may be updated to graphically present a shopping list item location such that shopping list indications for every shopping list item are displayed among the plurality of display units 118. In some embodiments, if the consumer location is not available at block 710, no display units are updated to graphically present the shopping list item locations because graphically presenting shopping list notifications may be confusing to other consumers and may not be useful when a location of a consumer is not known.

Still referring to FIG. 7 (and FIGS. 1 and 2), at block 724, it is determined whether the consumer has left the store. In some embodiments, the consumer is determined to have left the store based on a comparison of the current consumer location to a grid of the store area. If the consumer is determined to have left the store at block 724, any of the plurality of display units 118 that were updated to graphically present shopping list item locations may be updated at block 720 to remove the shopping list item locations, such as by updating the displays to return to a consumer mode in which the graphical output of the plurality of display units 118 presents graphical consumer information, such as product tags, price tags, coupons, discounts, or the like. If the consumer is determined not to have left the store at block 724, the method returns to block 724.

Although blocks 702-724 have been described as being separate tasks, in other embodiments, the blocks may be combined or omitted. Further, while the tasks of blocks 702-724 have been described as being performed in a particular order, in other embodiments, the tasks may be performed in a different order.

Figure 8:
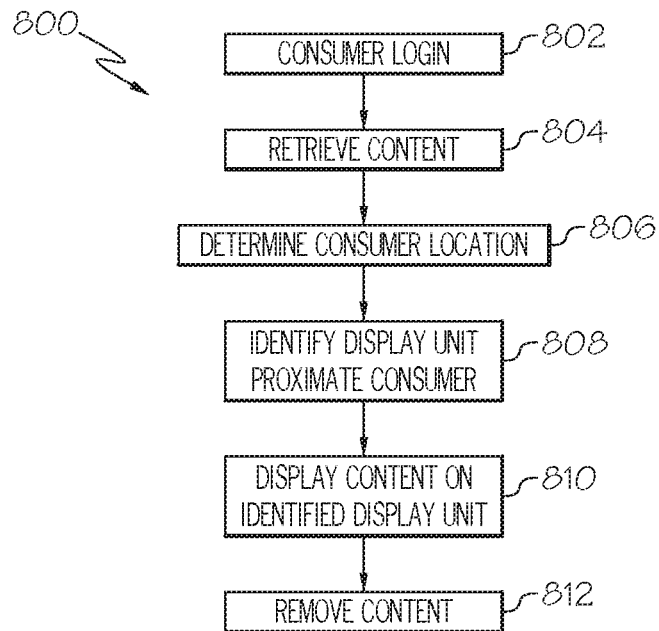
FIG. 8 graphically illustrates a computer-implemented method of graphically presenting personalized content to a consumer on one or more display units coupled to shelves of a modular shelving system, according to one or more embodiments shown and described herein.

Referring now to FIG. 8 (and FIGS. 1 and 2), a flowchart that graphically illustrates a method 800 of graphically presenting personalized content to a consumer on one or more of the plurality of display units 118 coupled to the plurality of shelves 116 of the modular shelving system 100 is provided. At block 802, a consumer may login or otherwise authenticate with the system. In some embodiments, the consumer may login by providing input to the personal assistant and liaison device 240, such as by entering a username and password on a keypad of the device or by scanning a loyalty card associated with the consumer with a barcode reader of the device. In some embodiments, the consumer may login with the mobile computing device 250, such as by logging into a smartphone application provided by the store. In some embodiments, the consumer login may cause the store computing system 400 or the enterprise computing system 300 to receive a consumer login message that includes a consumer identifier. The store computing system 400 or the enterprise computing system 300 may provide a message to one or more components of the store computing system 400 or the enterprise computing system 300 including the consumer identifier.

Still referring to FIG. 8 (and FIGS. 1 and 2), at block 804, content for display to the consumer is identified. In some embodiments, the content is identified based on the consumer identifier, such as when the store computing system 400 or the enterprise computing system 300 retrieves content for display to the consumer based on the consumer identifier. In some embodiments, the content includes store event data generated by the store computing system 400 or the enterprise computing system 300, such as a message that a consumer's deli order is ready to be picked up, a message that a consumer's pharmacy order is ready to be picked up, or the like. In some embodiments, the content may include special offers, promotions, advertisements, or the like. The content may be text messages, sound, images, videos, or the like. In some embodiments, the content to be displayed may be identified based on preferences set in a user profile, such as preferences that only certain types of content are displayed on the plurality of display units 118.

Still referring to FIG. 8 (and FIGS. 1 and 2), at block 806, the consumer location is determined. In some embodiments, the consumer location is determined based on a signal received from a global positioning system receiver embedded in the personal assistant and liaison device 240 or the mobile computing device 250. In other embodiments, the consumer location is determined based on a location of a receiver that wirelessly communicates with the personal assistant and liaison device 240 or the mobile computing device 250. In some embodiments, the location of the consumer is mapped to a store coordinate system, such as a store coordinate system that is associated with planogram data so that the consumer location can be mapped to shelves or display units proximate the consumer location. The consumer location may be determined in other ways, such as based on image data from one or more imaging devices coupled to the mobile computing device 250, the personal assistant and liaison device 240, or the store computing system 400. In some embodiments, the consumer location may be logged and location events (e.g., an event indicative that a consumer has entered a store, an event indicative that a consumer has exited a store, etc.) may be generated and stored in memory. In some embodiments, if the consumer location cannot be determined or is unavailable, the method 800 ends.

Still referring to FIG. 8 (and FIGS. 1 and 2), at block 808, it is determined whether the consumer is proximate one of the plurality of display units 118. In some embodiments, the consumer is determined to be proximate a display unit based on the consumer location, such as when the consumer is determined to be near a display unit when the consumer location is within a threshold distance of a display unit. In some embodiments, the consumer is determined to be proximate a display unit based on a location grid stored in the memory of the store computing system 400 or the enterprise computing system 300. In some embodiments, only a subset of the plurality of display units 118 may be appropriate for the display of consumer content. In such embodiments, block 808 may include determining whether the consumer is proximate one of the subset of display units.

Still referring to FIG. 8 (and FIGS. 1 and 2), at block 810, in response to determining that the consumer is proximate to the display unit, content is displayed to the consumer on the display unit identified at block 808. The graphical output of the display unit may be updated to reflect the content to be displayed. In some embodiments, the content may be formatted to be displayed by the display unit by the store computing system 400, and published to the display unit by transmitting a message including the content from the store computing system 400 to the display unit, along with an instruction to display the content on the display unit. In some embodiments, audible content may be provided by a speaker positioned near the consumer.

Still referring to FIG. 8 (and FIGS. 1 and 2), at block 812, content displayed on the display unit at block 810 may be removed. In some embodiments, the content is removed after a predetermined period of time has elapsed. In other embodiments, the content is removed in response to determining, based on the consumer location, that the consumer is no longer proximate the display unit.

Although blocks 802-812 have been described as being separate tasks, in other embodiments, the blocks may be combined or omitted. Further, while the tasks of blocks 802-812 have been described as being performed in a particular order, in other embodiments, the tasks may be performed in a different order.

Figure 9:
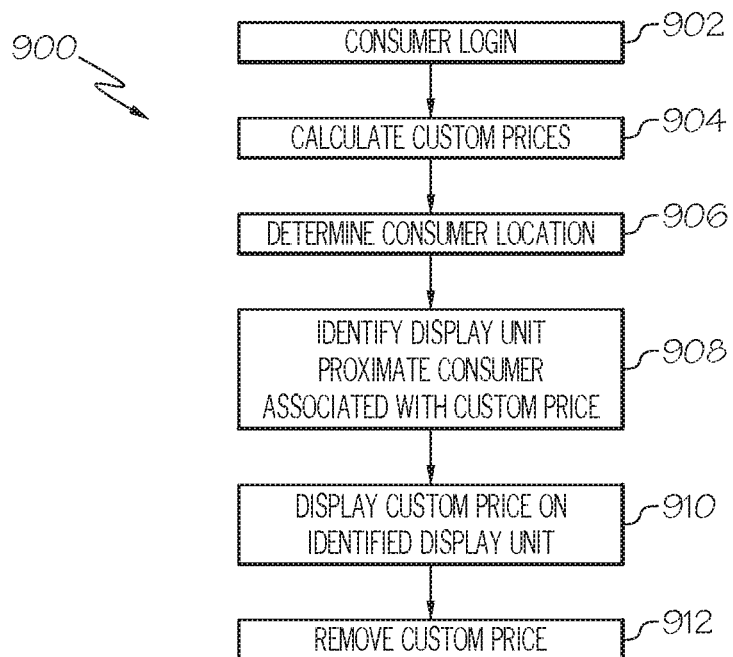
FIG. 9 graphically illustrates a computer-implemented method of graphically presenting customized pricing to a consumer on one or more display units coupled to shelves of a modular shelving system, according to one or more embodiments shown and described herein.

Referring now to FIG. 9 (and FIGS. 1 and 2), a method 900 of graphically presenting custom price information to a consumer on one or more of the plurality of display units 118 coupled to the plurality of shelves 116 of the modular shelving system 100 is provided. At block 902, a consumer may login or otherwise authenticate with the system. In some embodiments, the consumer may login by providing input to the personal assistant and liaison device 240, such as by entering a username and password on a keypad of the device or by scanning a loyalty card associated with the consumer with a barcode reader of the device. In some embodiments, the consumer may login with the mobile computing device 250, such as by logging into a smartphone application provided by the store. In some embodiments, the consumer login may cause the store computing system 400 or the enterprise computing system 300 to receive a consumer login message that includes a consumer identifier. The store computing system 400 or the enterprise computing system 300 may provide a message to one or more components of the store computing system 400 or the enterprise computing system 300 including the consumer identifier.

Still referring to FIG. 9 (and FIGS. 1 and 2), at block 904, custom prices for one or more products are calculated for the consumer based on the consumer identifier. In some embodiments, the custom prices are calculated based on prior shopping history of the consumer, consumer demographics, time of day, frequency of consumer shopping, or any other factor. In some embodiments, digital coupons or discounts are created and assigned to a loyalty card, or otherwise associated with the consumer.

Still referring to FIG. 9 (and FIGS. 1 and 2), at block 906, the consumer location is determined. In some embodiments, the consumer location is determined based on a signal received from a global positioning system receiver embedded in the personal assistant and liaison device 240 or the mobile computing device 250. In other embodiments, the consumer location is determined based on a location of a receiver that wirelessly communicates with the personal assistant and liaison device 240 or the mobile computing device 250. In some embodiments, the location of the consumer is mapped to a store coordinate system, such as a store coordinate system that is associated with planogram data so that the consumer location can be mapped to shelves or display units proximate the consumer location. The consumer location may be determined in other ways, such as based on image data from one or more imaging devices coupled to the mobile computing device 250, the personal assistant and liaison device 240, or the store computing system 400. In some embodiments, the consumer location may be logged and location events (e.g., an event indicative that a consumer has entered a store, an event indicative that a consumer has exited a store, etc.) may be generated and stored in memory. In some embodiments, if the consumer location cannot be determined or is unavailable, the method 900 ends.

Still referring to FIG. 9 (and FIGS. 1 and 2), at block 908, it is determined whether the consumer is proximate one of the plurality of display units 118 that is associated with a product for which a custom price has been calculated for the consumer. In some embodiments, the consumer is determined to be proximate such a display unit based on the consumer location, such as when the consumer is determined to be near such a display unit when the consumer location is within a threshold distance of such a display unit. In some embodiments, the consumer is determined to be proximate such a display unit based on a location grid stored in the memory of the store computing system 400 or the enterprise computing system 300. In some embodiments, only a subset of the plurality of display units 118 may be appropriate for the display of consumer content. In such embodiments, block 908 may include determining whether the consumer is proximate one of the subset of display units.

Still referring to FIG. 9 (and FIGS. 1 and 2), at block 910, in response to determining that the consumer is proximate to a display unit associated with a product for which a custom price has been calculated for the consumer, the custom price for the associated product is displayed to the consumer on the display unit. In some embodiments, other information, such as a digital coupon indicator, a percentage savings indicator, or the like, may be displayed. In some embodiments, the custom price is displayed when it is determined that another customer is not proximate the display unit because it may be undesirable to display a custom price intended for a particular customer to another customer who may not have access to a custom price for a product.

Still referring to FIG. 9 (and FIGS. 1 and 2), at block 912, custom price information displayed on the display unit at block 910 may be removed. In some embodiments, the custom price is removed after a predetermined period of time has elapsed. In other embodiments, the custom price is removed in response to determining, based on the consumer location, that the consumer is no longer proximate the display unit. In other embodiments, the custom price is removed in response to determining that another customer is proximate the display unit.

Although blocks 902-912 have been described as being separate tasks, in other embodiments, the blocks may be combined or omitted. Further, while the tasks of blocks 902-912 have been described as being performed in a particular order, in other embodiments, the tasks may be performed in a different order.

Figure 10:
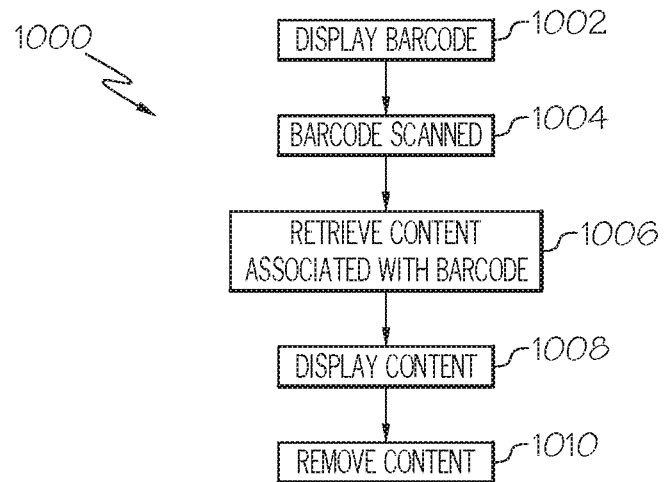
FIG. 10 graphically illustrates a computer-implemented method of graphically presenting content associated with a scanned barcode on one or more display units coupled to shelves of a modular shelving system, according to one or more embodiments shown and described herein.

Referring now to FIG. 10 (and FIGS. 1 and 2), a method 1000 of graphically presenting content associated with a scanned barcode on one or more of the plurality of display units 118 coupled to the plurality of shelves 116 of the modular shelving system 100 is provided. At block 1002, a barcode is displayed on one of the plurality of display units 118. The displayed barcode may be a UPC code, a QR code, a one dimensional bar code, a two-dimensional bar code, or the like. In some embodiments, the barcode is associated with a product located on one of the plurality of shelves 116 that is above or below the displayed barcode.

Still referring to FIG. 10 (and FIGS. 1 and 2), at block 1004, an indication that the displayed barcode has been scanned may be received. For example, in some embodiments the barcode displayed at block 1002 may be scanned with a barcode reader or camera of the personal assistant and liaison device 240 operated by a consumer seeking to view content associated with the scanned barcode. In some embodiments, the barcode may be scanned with a barcode reader or camera of the mobile computing device 250 operated by a consumer seeking to view content associated with the scanned barcode. In some embodiments (e.g., when the barcode is scanned by the personal assistant and liaison device 240), the indication may be received by the store computing system 400 over the store computing network 225. In some embodiments (e.g., when the barcode is scanned by the mobile computing device 250), the indication that the barcode has been scanned may be received by the store computing system 400 over the internet, such as when the mobile computing device 250 sends a message to the enterprise computing system 300 over the internet and the enterprise computing system 300 identifies the store computing system of the store where the barcode was scanned based on a store identifier in the message, and the enterprise computing system 300 transmits the message to the store computing system 400 of the store where the barcode was scanned. In some embodiments, in response to the barcode being scanned by the personal assistant and liaison device 240 or the mobile computing device 250, the store computing system 400 or the enterprise computing system 300 may receive a message including a store identifier, a shelf identifier, a display unit identifier, a barcode identifier, or the like.

Still referring to FIG. 10 (and FIGS. 1 and 2), at block 1006, content associated with the scanned barcode may be retrieved, such as from the store data repository 446*a* and/or the enterprise data repository 336*a*. In some embodiments, the retrieved content may be additional information associated with a product (e.g., a product located on one of the plurality of shelves 116 that is above or below the scanned barcode), a video, an image, a coupon, an advertisement, a marketing offer, or the like.

Still referring to FIG. 10 (and FIGS. 1 and 2), at block 1008, content is displayed on the display unit that initially displayed the scanned barcode or a display unit proximate that display unit. The graphical output of the display unit may be updated to reflect the content to be displayed. In some embodiments, the content may be formatted to be displayed by the display unit by the store computing system 400, and published to the display unit by transmitting a message including the content from the store computing system 400 to the display unit, along with an instruction to display the content on the display unit. In some embodiments, the content may include audible content that is provided by a speaker positioned near the consumer.

Still referring to FIG. 10 (and FIGS. 1 and 2), at block 1010, content displayed on the display unit may be removed. In some embodiments, the content is removed after a predetermined period of time has elapsed. In other embodiments, the content is removed in response to determining, based on the consumer location, that the consumer is no longer proximate the display unit.

Although blocks 1002-1010 have been described as being separate tasks, in other embodiments, the blocks may be combined or omitted. Further, while the tasks of blocks 1002-1010 have been described as being performed in a particular order, in other embodiments, the tasks may be performed in a different order.

Figure 11:
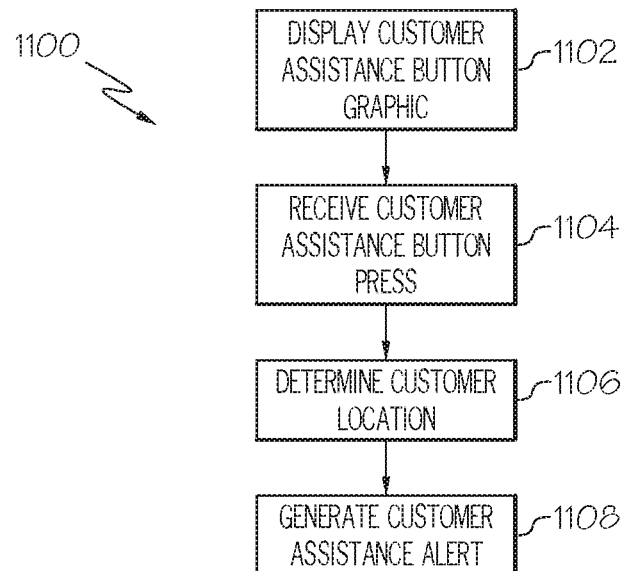
FIG. 11 graphically illustrates a computer-implemented method of generating a customer assistance alert, according to one or more embodiment shown and described herein.

Referring now to FIG. 11 (and FIGS. 1 and 2), a method 1100 of generating a customer assistance alert is provided. At block 1102, a customer assistance graphic is graphically displayed on one of the plurality of display units 118. The displayed customer assistance graphic may have any shape and may include text, such as "request assistance," "help," or the like. In some embodiments, the customer assistance graphic is a customer assistance button graphic.

Still referring to FIG. 11 (and FIGS. 1 and 2), at block 1104, input indicative of a customer assistance button press is received. In some embodiments, the input is received from one of the plurality of display units 118, such as when the display unit on which the customer assistance graphic is displayed includes a touchscreen interface and the display unit detects tactile input on the touchscreen interface in the customer assistance graphic region of the touchscreen interface. In other embodiments, the input may be received from a separate tactile input device, such as a button, keypad, or switch located near the displayed customer assistance graphic.

Still referring to FIG. 11 (and FIGS. 1 and 2), at block 1106, a customer location of the customer that pressed the button is determined. In some embodiments, the customer location is determined based on an identifier of the display unit on which the customer assistance graphic is displayed, such as embodiments that map the location of display units on a store coordinate system. In some embodiments, the customer location is determined based on a signal received from a global positioning system receiver embedded in the personal assistant and liaison device 240 or the mobile computing device 250, when such a device is being used by the customer. In other embodiments, the customer location is determined based on a location of a receiver that wirelessly communicates with the personal assistant and liaison device 240 or the mobile computing device 250.

Still referring to FIG. 11 (and FIGS. 1 and 2), at block 1108, a customer assistance alert is generated in response to receiving the input indicative of the customer assistance button press. In some embodiments, the alert includes the customer location. In some embodiments, the customer assistance alert including the customer location is transmitted from the store computing system 400 to the retail associate device 230, which provides a graphic or audible output to an associate operating the retail associate device 230 that a customer needs assistance at the customer location.

Although blocks 1102-1108 have been described as being separate tasks, in other embodiments, the blocks may be combined or omitted. Further, while the tasks of blocks 1102-1108 have been described as being performed in a particular order, in other embodiments, the tasks may be performed in a different order.

Figure 12:
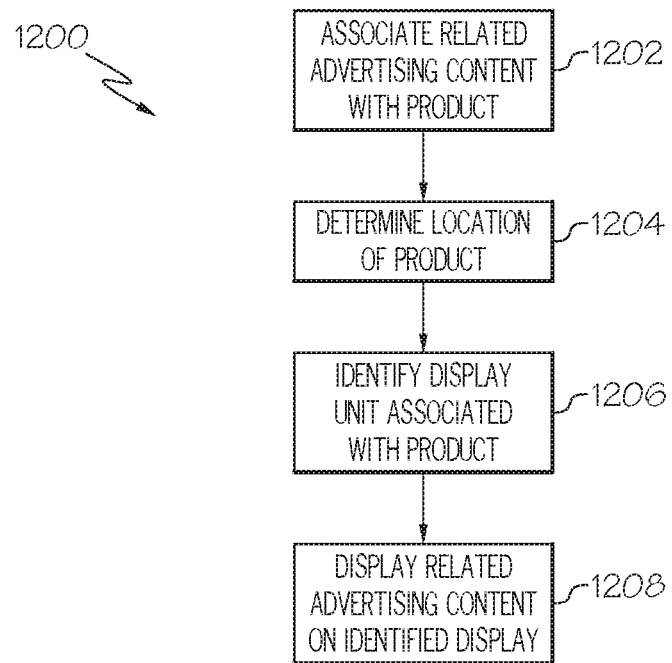
FIG. 12 graphically illustrates a computer-implemented method of displaying related advertising content on a display unit coupled to a shelf of a modular shelving system, according to one or more embodiments shown and described herein.

Referring now to FIG. 12 (and FIGS. 1 and 2), a method 1200 of displaying related advertising content is provided. At block 1202, related advertising content is associated with a product. In some embodiments, the advertising content is an advertisement for a related product or another product that a consumer may wish to buy. The related advertising content may be text information, an image, a video, or the like. The related advertising content may be designed to influence a consumer to move to another part of the store to locate a related product.

Still referring to FIG. 12 (and FIGS. 1 and 2), at block 1204, a location of the product is identified. In some embodiments, the location is identified based on planogram data that maps products to locations. At block 1206, a display unit associated with the product is identified. In some embodiments, the display unit associated with the product is identified based on planogram data that maps display units to product locations.

Still referring to FIG. 12 (and FIGS. 1 and 2), at block 1206, the related advertising content is displayed on the display unit identified at block 1206. The graphical output of the display unit may be updated to reflect the related advertising content to be displayed. In some embodiments, the related advertising content may be formatted to be displayed by the display unit by the store computing system 400, and published to the display unit by transmitting a message including the related advertising content from the store computing system 400 to the display unit, along with an instruction to display the related advertising content on the display unit.

Still referring to FIG. 12 (and FIGS. 1 and 2), at block 1208, the related advertising content displayed on the display unit at block 1206 may be removed. In some embodiments, the related advertising content is removed after a predetermined period of time has elapsed.

In some embodiments, the related advertising content may be targeted to a particular consumer, such as when it is determined that a consumer is proximate a display unit (e.g., in the manner described above with respect to FIG. 8), related advertising content targeted to the consumer may be displayed on the display unit.

Although blocks 1202-1208 have been described as being separate tasks, in other embodiments, the blocks may be combined or omitted. Further, while the tasks of blocks 1202-1208 have been described as being performed in a particular order, in other embodiments, the tasks may be performed in a different order.

Figure 13:
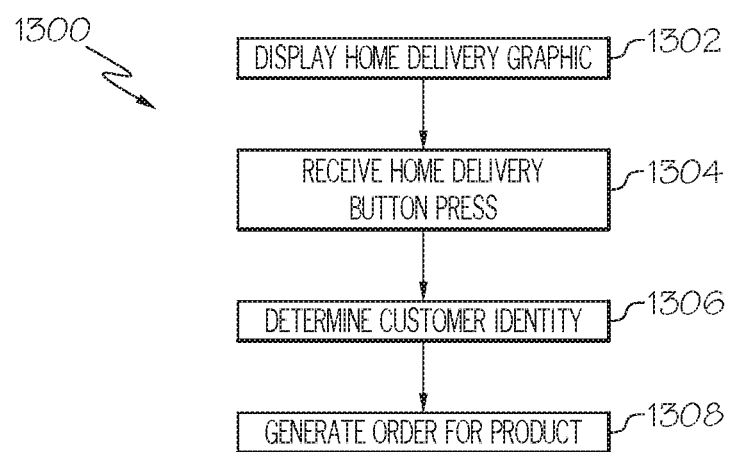
FIG. 13 graphically illustrates a computer-implemented method of generating an order for home delivery of a product, according to one or more embodiments shown and described herein.

Referring now to FIG. 13 (and FIGS. 1 and 2), a method 1300 of generating an order for home delivery of a product is provided. At block 1302, a home delivery graphic is graphically displayed on one of the plurality of display units 118 proximate a product that is available to be delivered to the consumer's home. The displayed home delivery graphic may have any shape and may include text, such as "deliver to home," "home delivery," or the like. In some embodiments, the home delivery graphic is a home delivery button graphic.

Still referring to FIG. 13 (and FIGS. 1 and 2), at block 1304, input indicative of a home delivery button press is received. In some embodiments, the input is received from one of the plurality of display units 118, such as when the display unit on which the home delivery graphic is displayed includes a touchscreen interface and the display unit detects tactile input on the touchscreen interface in the home delivery graphic region of the touchscreen interface. In other embodiments, the input may be received from a separate tactile input device, such as a button, keypad, or switch located near the displayed home delivery graphic.

Still referring to FIG. 13 (and FIGS. 1 and 2), at block 1306, a consumer identity is determined. The consumer identity may be determined by receiving user input via the display unit, via the personal assistant and liaison device 240, via the mobile computing device, for example. In other embodiments, the consumer identity may be determined by scanning a consumer identification barcode (e.g., a consumer loyalty card) with a barcode reader coupled to the plurality of shelves 116.

Still referring to FIG. 13 (and FIGS. 1 and 2), at block 1308, in response to receiving the input indicative of the home delivery button press and determining the consumer identity, an order for the product may be generated. In some embodiments, the order may include payment information, address information, shipping preferences, or the like, each of which may be determined based on a consumer profile associated with the consumer identifier.

Although blocks 1302-1308 have been described as being separate tasks, in other embodiments, the blocks may be combined or omitted. Further, while the tasks of blocks 1102-1108 have been described as being performed in a particular order, in other embodiments, the tasks may be performed in a different order.

Figure 14:
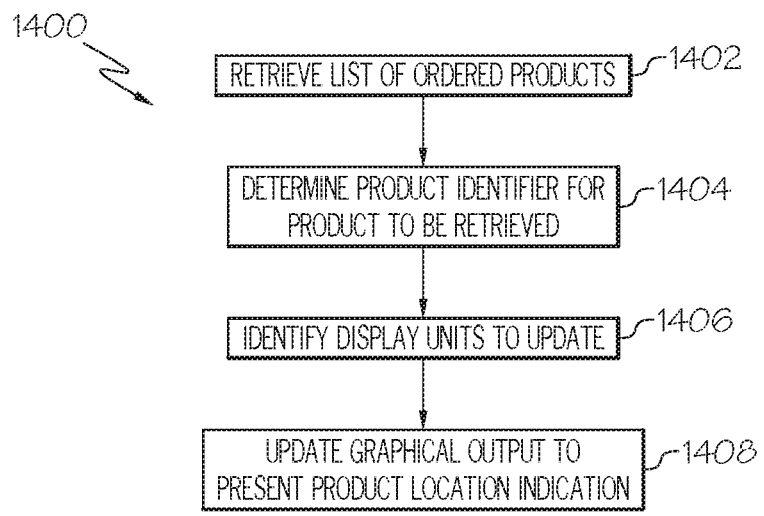
FIG. 14 graphically illustrates a computer-implemented method of graphically presenting a product location indication on one or more display units coupled to shelves of a modular shelving system, according to one or more embodiments shown and described herein.

Referring now to FIG. 14 (and FIGS. 1 and 2), a flowchart that graphically illustrates a method 1400 of graphically presenting a product location indication on at least one of the plurality of display units 118 is provided. As will be apparent from the description below, the method 1400 may facilitate an associate's retrieval of a product previously ordered by a customer from the plurality of shelves 116 by presenting a product location indication on the plurality of display units 118, such that the plurality of display units 118 provide a visual cue for the associate as to the appropriate location to retrieve the product from the plurality of shelves 116. Such a visual cue may allow the associate to quickly and accurately identify the appropriate location from which to retrieve the product.

Still referring to FIG. 14 (and FIGS. 1 and 2), at block 1402, a list of ordered products may be retrieved. In some embodiments, the list of ordered products may be generated in response to a customer remotely ordering the products for in-store pickup. In some embodiments, the customer may order the products online using a computer, a smartphone, or the like. The customer may wish to pick up the ordered products at the store, after an associate has retrieved the products from the list from the appropriate shelves. In some embodiments, the enterprise computing system 300 may transmit the list to the store computing system 400, though embodiments are not limited thereto.

Still referring to FIG. 14 (and FIGS. 1 and 2), at block 1404, after receiving the list of ordered products, a product identifier corresponding to a product on the list to be retrieved from the plurality of shelves 116 may be determined. In some embodiments, the product identifier may be determined by looking up the product identifier from a database that matches the ordered product to its associated product identifier. In some embodiments, the product identifier is a sequence of digits (e.g., the sequence of digits represented by a UPC code), though embodiments are not limited thereto.

Still referring to FIG. 14 (and FIGS. 1 and 2), at block 1406, in response to determining the product identifier corresponding to the ordered product, at least one of the plurality of display units 118 to update may be identified. In some embodiments, the display units to be updated may be identified by the store computing system 400 based on planogram data stored in the store data repository 436a or planogram data stored in the enterprise data repository 336a that maps the product identifier to one or more of the plurality of display units 118.

Still referring to FIG. 14 (and FIGS. 1 and 2), at block 1408, in response to identifying the one or more display units to update, a graphical output of the one or more display units identified to be updated in block 1408 may be updated to present a product location indication. In some embodiments, the product location indication may be indicative of a location on a shelf above or below the one or more display units from which the product is to be retrieved. In some embodiments, the graphical output of one or more of the identified display units may be updated to include an arrow pointing to the location on the plurality of shelves 116 from which the product is to be retrieved. In some embodiments, the graphical output of one or more of the identified display units may be updated to include an animation indicative of the location on the plurality of shelves 116 from which the product is to be retrieved. In some embodiments, a color of the background of one or more of the identified display units may be changed relative to the background of the display units that are not associated with the product to be retrieved. In other embodiments, a graphical output of the identified display units may be updated in a different manner to graphically distinguish the display units associated with the product to be retrieved from the other display units. By presenting the product location indication on the appropriate display unit or display units, an associate's retrieving the ordered product from the plurality of shelves 116 may be facilitated by providing the associate with a visual cue that allows the associate to quickly and accurately identify the appropriate location to retrieve the product from, thereby increasing the speed and accuracy of retrieving products from the plurality of shelves 116. In some embodiments, the graphical output of the one or more display units identified to be updated may be updated to present the product location indication in response to a message and/or content transmitted from the store computing system 400 to the one or more display units 118 via the store computing network 225. In some embodiments, the resource server logic 443 of the store computing system 400 may render the image or video data to be displayed on the plurality of display units 118 as the updated graphical output. In some embodiments, the shelf integration logic 444 of the store computing system 400 sends the message or content to the plurality of display units 118 that cause the graphical output to be updated. In some embodiments, an audible product location indication may be provided by a speaker positioned near the location from which the product is to be retrieved.

The product location indication may guide the associate to the appropriate location of the plurality of shelves 116 from which the ordered product is to be retrieved.

Although blocks 1402-1408 have been described as being separate tasks, in other embodiments, the blocks may be combined or omitted. Further, while the tasks of blocks 1402-1408 have been described as being performed in a particular order, in other embodiments, the tasks may be performed in a different order.

Figure 15:
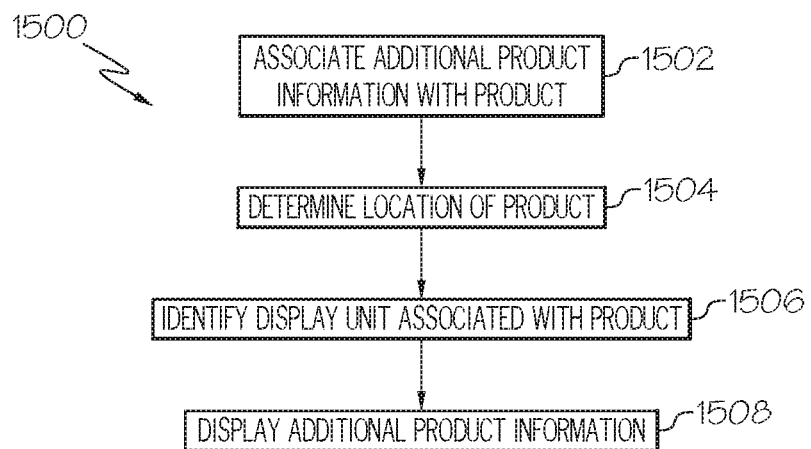
FIG. 15 graphically illustrates a computer-implemented method of displaying additional product information on a display unit coupled to a shelf of a modular shelving system, according to one or more embodiments shown and described herein.

Referring now to FIG. 15 (and FIGS. 1 and 2), a method 1500 of displaying additional product information is provided. At block 1502, additional product information is associated with a product. In some embodiments, the additional product information is additional information related to a product located on the plurality of shelves 116, such as allergen information, whether the product is gluten-free, sourcing information, a recommended wine to pair with the product, or the like. The additional product information may be text information, an image, a video, or the like.

Still referring to FIG. 15 (and FIGS. 1 and 2), at block 1504, a location of the product is identified. In some embodiments, the location is identified based on planogram data that maps products to locations. At block 1506, a display unit associated with the product is identified. In some embodiments, the display unit associated with the product is identified based on planogram data that maps display units to product locations.

Still referring to FIG. 15 (and FIGS. 1 and 2), at block 1508, the additional product information is displayed on the display unit identified at block 1506. The graphical output of the display unit may be updated to reflect the additional product information to be displayed. In some embodiments, the additional product information may be formatted to be displayed by the display unit by the store computing system 400, and published to the display unit by transmitting a message including the additional product information from the store computing system 400 to the display unit, along with an instruction to display the additional product information on the display unit.

Although blocks 1502-1508 have been described as being separate tasks, in other embodiments, the blocks may be combined or omitted. Further, while the tasks of blocks 1502-1508 have been described as being performed in a particular order, in other embodiments, the tasks may be performed in a different order.

The method steps of each of the methods described above may be executed by one or more computing devices, such as, but not limited to, the enterprise computing system 300, the store computing system 400, the retail associate device 230, the personal assistant and liaison device 240, and the mobile computing device 250. Furthermore, in some embodiments, the execution of one or more methods steps of any of the above methods may be distributed among multiple computing devices.

Information displayed on the plurality of display units 118 and the interaction with the plurality of display units 118 is not limited to the embodiments described above.

For example, some embodiments may control the brightness of a product tag, label, coupon, or the like, that is displayed on the display unit in order to influence customer purchasing. In embodiments, that control the brightness of such displayed content, the brightness may be altered by transmitting a brightness level indicator indicative of the brightness of the content from the store computing system 400 to the plurality of display units 118 along with the content to be displayed on the display unit. In response to receiving the content and the brightness level indicator, the display unit may display the content at a brightness that is based on the brightness level indicator. In some embodiments, the brightness level of content displayed on a display unit is calculated based on whether a consumer determined to be proximate the display unit, or the identity of a particular customer determined to be proximate the display unit.

Some embodiments may facilitate the tracking of consumer eyes to determine what products or content displayed on the plurality of display units 118 is being viewed by a consumer. In some embodiments, the modular shelving system 100 includes an eye tracking system, which may include cameras, infrared sensors, eye tracking software, or any other sensing components and processing software. Some embodiments may identify a user proximate one of the plurality of display units 118, such as in the manner described in detail above. The eye tracking system may then determine what products or content displayed on the plurality of display units 118 is being viewed by a consumer. In some embodiments, in response to tracking the consumer's eyes, additional content may be displayed on the display unit in a direction the consumer is looking or in a direction in the field of view of the consumer to draw the consumer's eye to the location where additional content is displayed. Embodiments may also log consumer identification data, timestamps, and coordinates for portions of the display units (or positions of products on the plurality of shelves 116) being viewed by the consumer. Such data may be correlated with separately tracked consumer location data. Reports for marketing or shopper demographics may be generated based on such data.

The embodiments described herein may also be used for timed promotional pricing or timed coupons (e.g., 10 minute specials, senior discounts, etc.). In such embodiments, the enterprise computing system 300 may utilize business rules (e.g., start and stop dates, pricing events, discount calculations, buy one get one free offers, etc.) to defined promotional rules that are transmitted to the store computing system 400. The store computing system 400 may receive the promotional rules and monitor data (e.g., price events, inventory events, planogram events, shopper events, loyalty data, etc.) to execute the promotional rules. For example, the store computing system 400 may detect a promotion and update a price for an item with the price manager logic 441. The price manager logic 441 may send a message to the shelf integration logic 444, which in turn sends a message or content to the plurality of display units 118 to cause one or more of the plurality of display units 118 to display the updated price. When the promotion ends, the price may be reset and the display unit may display the rest price. Some embodiments also indicate on the plurality of display units 118 which products are more popular, introducing a social aspect to the shopping experience.

The embodiments described herein may also be used for real time price changing of products. For example, in some embodiments, the store computing system 400 may determine that a price for a product should be updated, the store computing system 400 may transmit a message including a product identifier and an updated price to a display unit associated with the product, and the display unit may update its display to reflect the updated price. Such price changes may be for a limited duration or may be based on whether a consumer is proximate the display unit, or based on an identity of a consumer proximate the display unit.

The embodiments described herein may also provide real time stock and ordering information on the plurality of display units 118, such as when the store computing system 400 determines that a product on the shelf is in low stock or needs to be re-ordered, transmits a message to the plurality of display units 118, and the plurality of display units 118 provides a graphical indication (e.g., a barcode, a colored indication, or the like) that the product need to be reordered or that the stock of the product is low. In some embodiments, a colored reorder indicator (e.g., a red tag) including a barcode is displayed by a display unit associated with a product that needs to be reordered. An associate may then scan the barcode with the retail associate device 230, thereby triggering a reorder of a product in low stock. In some embodiments, the plurality of display units 118 display a quantity of a particular product on hand, a quantity of an amount of the product on order, a computer assisted ordering system status for a product, or other stocking or ordering information.

The embodiments described herein may perform a number of additional functions, such as displaying coupons or other information associated with a product on one of the plurality of display units 118 proximate to the product when it is determined that a consumer is reaching for the product, displaying content on a display unit in different formats based on an identity of a consumer proximate to a display unit (i.e., displaying content in a larger font when an elderly consumer is identified proximate to the display unit), displaying entertainment content when a consumer is proximate to a display unit (e.g., displaying videos, pictures, or animations that may entertain a child when a child is determined to be proximate to a display unit), displaying content for an in-store scavenger hunt or shopping game on one of the plurality of display units 118, or the like. Some embodiments may include a microphone positioned on or near the plurality of shelves 116 that receives audible input, which may be used by embodiments herein for a variety of purposes, such as to identify a consumer based on voice recognition technology, to determine input from a consumer, or the like.

It should now be understood that the systems and methods described herein may display a variety of information useful to associates working at a store selling products, consumers shopping at a store that sells products, and others. Such useful information includes displayed product location indications that facilitate the stocking of products by associates, planogram set information useful to an associate performing a planogram set, shopping list item locations displayed to consumers to help consumers quickly locate items on shopping lists, customized messages displayed to consumers when the consumers are proximate to a display unit, customized pricing information, and many other types of information.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for graphically presenting a product location indication on one or more display units, the system comprising:
    one or more display units configured to be coupled to shelves of a modular shelving system;
    one or more processors communicatively coupled to the one or more display units;
    one or more memory components communicatively coupled to the one or more processors; and
    machine readable instructions stored in the one or more memory components that, when executed by the one or more processors, cause the system to:
    receive input indicative of a request to set a planogram;
    determine the planogram to be set;
    compare the planogram to be set with a prior planogram;
    identify one or more display units to update based on the comparison of the planogram to be set and the prior planogram; and
    in response to identifying the one or more display units to update, update a graphical output of the one or more display units identified to be updated to graphically present planogram set information associated with the planogram to be set.

2. The system of claim 1, wherein the graphically presented planogram set information provides a visual indication of changes to be made to a current placement of products on a plurality of shelves.

3. The system of claim 1, wherein the graphically presented planogram set information includes an animation of a visual contraction or expansion of an area where a product is to be set according to the planogram.

4. The system of claim 1, wherein the machine readable instructions, when executed by the one or more processors, cause the system to:
- receive input indicative of a completion of the planogram set; and
- in response to receiving the input indicative of the completion of the planogram set, change the one or more display units to a consumer mode.

5. The system of claim 1, wherein the machine readable instructions, when executed by the one or more processors, cause the system to:
- in response to identifying the one or more display units to update, change a color of a graphical output of the one or more display units identified to be updated based on actions to be taken for the one or more display units.

6. The system of claim 1, wherein the graphically presented planogram set information includes different colors associated with actions to be taken.

7. The system of claim 6, wherein the actions include at least one of adding a product and removing a product.

8. The system of claim 1, wherein the graphically presented planogram set information includes an arrow pointing to a location on one of the shelves that a product is to be set.

* * * * *